(12) United States Patent
Muller et al.

(10) Patent No.: US 6,873,630 B1
(45) Date of Patent: Mar. 29, 2005

(54) METHOD AND APPARATUS FOR A MULTI-GIGABIT ETHERNET ARCHITECTURE

(75) Inventors: Shimon Muller, Sunnyvale, CA (US); Ariel Hendel, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/314,782

(22) Filed: May 19, 1999

(51) Int. Cl.$^7$ ............................................... H04L 12/56

(52) U.S. Cl. ...................................... 370/556; 370/542

(58) Field of Search ................................ 370/352, 355, 370/356, 358, 474, 536, 542, 401

(56) References Cited

U.S. PATENT DOCUMENTS

| | | | | |
|---|---|---|---|---|
| 5,065,396 A | * | 11/1991 | Castellano et al. | |
| 5,140,585 A | * | 8/1992 | Tomikawa | 370/354 |
| 5,321,816 A | * | 6/1994 | Rogan et al. | 705/42 |
| 5,438,571 A | | 8/1995 | Albrecht et al. | 370/94.3 |
| 5,608,733 A | * | 3/1997 | Vallee et al. | 370/394 |
| 5,640,605 A | | 6/1997 | Johnson et al. | 395/881 |
| 6,012,074 A | * | 1/2000 | Lucas et al. | 715/531 |
| 6,148,010 A | * | 11/2000 | Sutton et al. | 370/536 |
| 6,198,749 B1 | * | 3/2001 | Hui et al. | 370/463 |
| 6,205,142 B1 | * | 3/2001 | Vallee | 370/394 |
| 6,222,858 B1 | * | 4/2001 | Counterman | 370/474 |

FOREIGN PATENT DOCUMENTS

| | | | | |
|---|---|---|---|---|
| GB | 2 332 128 | 6/1999 | ........... | H04L/25/14 |

OTHER PUBLICATIONS

Christine Zimmerman, et al., "Trunking Branches Out," Dec. 1998, *Data Communications*, vol. 27, No. 18, pp. 62–66, 68–69.

* cited by examiner

*Primary Examiner*—Kenneth Vanderpuye
(74) *Attorney, Agent, or Firm*—Park, Vaughan & Fleming LLP

(57) ABSTRACT

An Ethernet architecture is provided for connecting a computer system or other network entity to a dedicated Ethernet network medium. The network interface enables the transmission and receipt of data by striping individual Ethernet frames across a plurality of logical channels and may thus operate at substantially the sum of the individual channel rates. Each channel may be conveyed by a separate conductor (e.g., in a bundle) or the channels may be carried simultaneously on a shared medium (e.g., an electrical or optical conductor that employs a form of multiplexing). On a sending station, a distributor within the sender's network interface receives Ethernet frames (e.g., from a MAC) and distributes frame bytes in a round-robin fashion on the plurality of channels. Each "mini-frame" is separately framed and encoded for transmission across its channel. On a receiving station, the receiver's network interface includes a collector for collecting the multiple mini-frames (e.g., after decoding) and reconstructing the frame's byte stream (e.g., for transfer to the receiver's MAC). The first and last bytes of each frame and mini-frame are marked for ease of recognition. Multiple unique idle symbols may be employed for transmission during inter-packet gaps to facilitate the collector's synchronization of the multiple channels and/or enhance error detection. A maximum channel skew is specified, and each received channel may be buffered with an elasticity that is proportional to the maximum skew so that significant propagation delay may be encountered between channels without disrupting communications.

125 Claims, 9 Drawing Sheets

CHANNEL 2

CHANNEL 3

CHANNEL 4

METHOD AND APPARATUS FOR A MULTI-GIGABIT ETHERNET ARCHITECTURE

BACKGROUND

This invention relates to the fields of computer systems and networks. More particularly, a method and apparatus are provided for interfacing a computer system or other device to an Ethernet network at a high rate of data transfer.

Computer systems have evolved from objects of interest mainly for hobbyists and professionals into essential tools of a large portion of the population. Along with the increase both in number and capability of computer systems, the need to communicate between them also continues to grow. From early use in sharing peripheral equipment and carrying electronic mail to their use in today's distributed applications and client/server architectures, networks for carrying computer communications have rapidly evolved in size and scope.

One particular network architecture, Ethernet, has remained predominant in many computing environments even while network transmission rates have increased exponentially. While a communication rate of 10 Mbps was once the mark of a fast Ethernet local area network (LAN), today one can obtain and install an Ethernet network 100 times as fast (i.e., 1 Gbps). In particular, the IEEE (Institute of Electrical and Electronics Engineers) 802.3 standard specifies, in detail, the accepted data link protocols for such a network.

Just as there was clear need for today's fast networks, there is no doubt that networks capable of even faster transmission rates will be readily implemented when available. One can be certain that new computer systems and applications, as well as those that currently communicate over 1 Gbps (and slower) networks, will make meaningful use of networks operating at multiple Gbps rates. Some types of operations that will likely welcome the higher bandwidth include multi-media, database, modeling, and other areas that require or generate large amounts of data.

For example, computer system "clusters" and other highly interconnected computer systems will greatly benefit from faster communication rates. In particular, because computations and operations in such a cluster are often shared or distributed among multiple end nodes, their desire for rapid network communications may be limited only by their internal operating rates (e.g., the rate at which a cluster member's CPU communicates with internal memory). Since communications transiting these types of networks are often conducted at high-priority system levels (e.g., rather than at relatively low-priority user levels), the faster the communications can be conveyed, the more time the systems will have to devote to user activities.

An application operating with a network other than a cluster or a LAN, such as a MAN (Metropolitan Area Network), WAN (Wide Area Network) or RAN (Regional Area Network), may also benefit from an increased transmission rate. In these types of networks, however, applications communicate over much longer distances than, for example, applications in a computer cluster.

Thus, there is a need for a network architecture capable of operating at transmission rates above 1 Gbps. In particular, there is a need for means with which to interface a computer system or other network entity to a network such that the interface can pass network traffic at a rate exceeding 1 Gbps. Because of the plethora of networks and network components that utilize the Ethernet protocol, and the familiarity that this technology enjoys among programmers, developers and designers, it would be very advantageous to implement such a network using Ethernet. An Ethernet network interface operating above 1 Gbps would preferably be compatible with most, if not all, preexisting Ethernet implementations. The interface would, preferably, be suitable for environments such as computer clusters, which may operate over short distances, as well as networks that operate over greater, even regional, distances.

SUMMARY

In one embodiment of the invention, a system and methods are provided for interfacing a computer system or other network entity to an Ethernet network, and for transferring data to and from the entity at multiple gigabits per second.

An Ethernet network in this embodiment comprises one or more physical links consisting of virtually any type of medium (e.g., fiber, wire). Illustratively, however, the network operates in a dedicated mode such that communications are carried in a full-duplex mode of operation only except possibly when operating at a lower communication speed.

Network entities exchanging communications across the network each incorporate a network interface for inserting a communication onto and removing it from the network. A network interface in one embodiment of the invention may comprise one or more integrated circuits, printed circuit boards, software modules, etc.

When a communication is to be transmitted across the network by a first network entity, its interface divides the communication into multiple logical channels. Each channel may transit a different physical link, such as a separate fiber-optic or wire cable, or a common physical link, such as a fiber employing a Wave Division Multiplexing (WDM) mode of operation. A network interface at the receiving entity receives the multiple channels and re-assembles them for transfer to the entity.

In one embodiment of the invention the communication is divided for transmission across multiple channels at a point below the Medium Access Control (MAC) layer of operation. Thus, in this embodiment the individual bytes of each frame, or packet, of the communication are separated and sent across one of the channels in a round-robin fashion. The transmission rate of the communication across the Ethernet network thus approximates the sum of the rates of each channel. In one particular embodiment of the invention four logical channels are employed, each operating at approximately 2.5 Gbps, in order to sustain a transfer rate of 10 Gbps for a communication.

Illustratively, the size of each mini-frame of an Ethernet frame (i.e., the portion of the frame carried by one channel) will equal the size of the other mini-frames, plus or minus one byte. This provides one easy method of detecting an error in the transmission or reception of a frame. Further, frame sequencing may be enforced by providing multiple different codes or symbols to represent the period between frames (e.g., the Inter-Packet Gap or IPG). With this method of frame sequencing, a receiving entity may synchronize the multiple channels by monitoring which codes or symbols are received during each gap.

In one embodiment of the invention a buffer is maintained for each channel in a receiving network interface. The size of a buffer may be proportional to the maximum amount of channel skew that is expected (e.g., the difference in propagation times across the channels).

DETAILED DESCRIPTION

Figure 1:
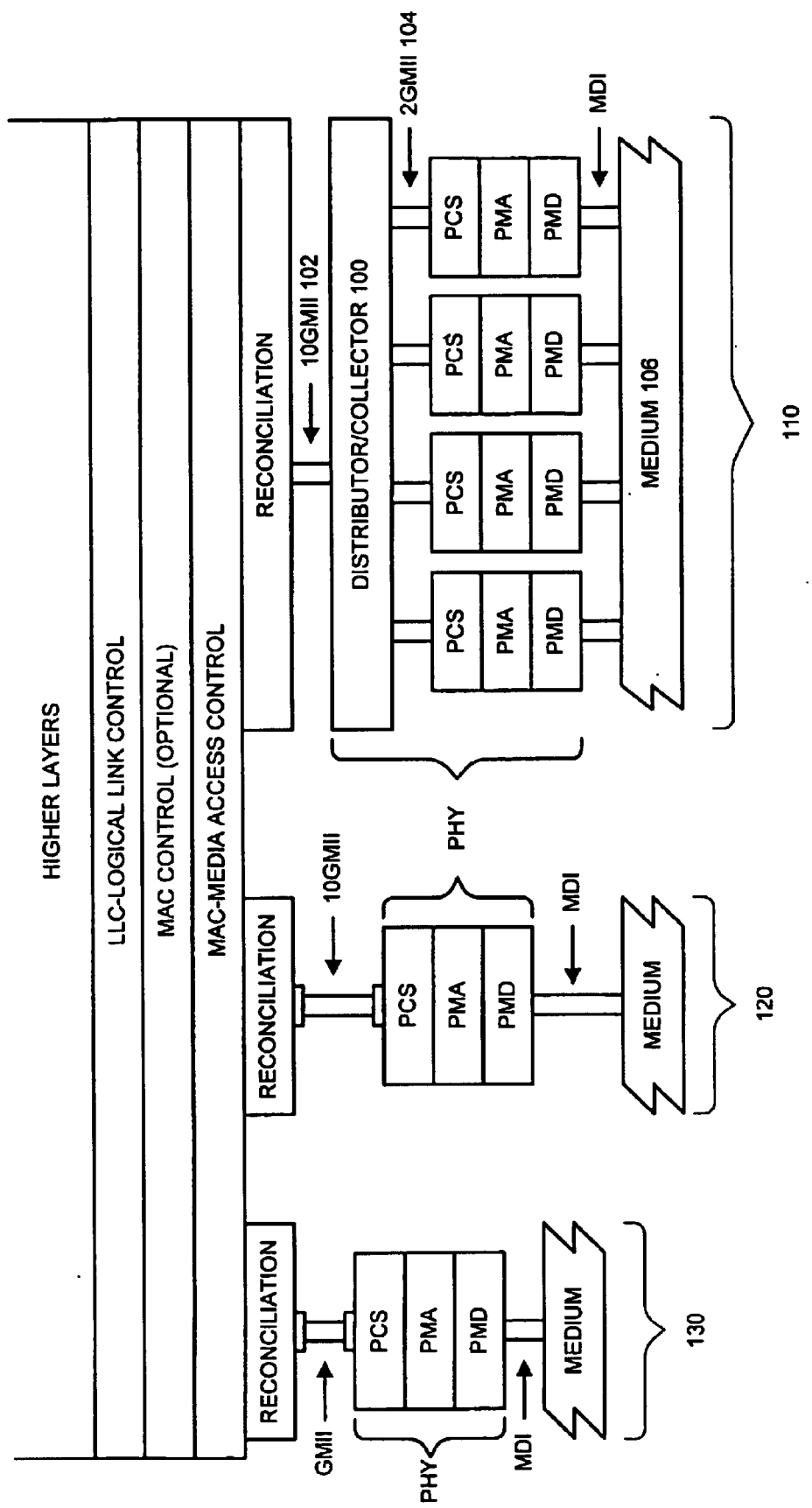
FIG. 1 is a diagram depicting the conceptual layering of the functions of one embodiment of the invention, illustrated in association with an existing Gigabit Ethernet architecture.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, an apparatus and associated methods for implementing a high-speed Ethernet network interface is provided. Such an interface is suitable, for example, in a computer system or other communication device that is coupled to an Ethernet network. One skilled in the art will recognize that the present invention is not limited in terms of the construction of the Ethernet network to which the communication device is coupled. Networks constructed from one or more fiber-optic or electrical conductors are suitable, as are other means of carrying a signal from one network entity to another.

The program environment in which a present embodiment of the invention is executed illustratively incorporates a general-purpose computer or a special purpose device such a hand-held computer. Details of such devices (e.g., processor, memory, data storage and display) are well known and are omitted for the sake of clarity.

It should also be understood that the techniques of the present invention might be implemented using a variety of technologies. In particular, the methods described herein may be implemented in software running on a computer system, or implemented in hardware utilizing either a combination of microprocessors or other specially designed application specific integrated circuits, programmable logic devices, or various combinations thereof. As just one example, which in no way limits the form or scope of the invention, the methods described herein may be implemented in association with a series of computer-executable instructions residing on a storage medium such as a carrier wave, disk drive, or computer-readable medium. Exemplary forms of carrier waves may take the form of electrical, electromagnetic or optical signals conveying digital data streams along a local network or a publicly accessible network such as the Internet.

In one embodiment of the invention, an interface is described for connecting a computer system to an Ethernet network at a data transfer rate exceeding 1 Gbps. In one particular implementation of this embodiment, the network interface exchanges communications with the Ethernet network at a rate of approximately 10 Gbps.

In this embodiment the Ethernet network carries communications between the computer system and another network entity (e.g., a router, a switch, another computer) in a dedicated configuration. In other words, an Ethernet network compatible with this embodiment operates as a dedicated medium for conveying communications between entities in a full duplex mode of operation.

The presently described embodiment achieves a high data communication rate (e.g., 10 Gbps) by dividing, or striping, a data stream directed from one network entity to another network entity into multiple logical channels. The logical channels may be conveyed by one or more physical links. For example, a single physical link may be configured to use frequency division multiplexing (FDM) or wave division multiplexing (WDM) in order to carry the logical channels over one electrical or optical conductor. Alternatively, two or more separate physical conductors may be employed. In one particular embodiment, each logical channel is carried by a separate physical conductor, such as individual fiber-optic strands in a fiber bundle or ribbon, or as a separate wireless signal.

As will be apparent to one skilled in the art, by distributing or striping a data stream across multiple channels, the data stream can be transmitted at substantially the sum of the individual channels.

FIG. 1 demonstrates how one embodiment of the invention may be viewed in relation to the IEEE standard 802.3 Ethernet specification. Reference numeral 130 identifies an existing Gigabit Ethernet standard specification (i.e., standard 802.3, 1998 edition, depicted in Clause 35 of the specification) at the Physical layer. In the existing Ethernet architecture a Gigabit PHY (Physical layer device) is coupled to higher layers of the network model by a Gigabit Media Independent Interface (GMII).

FIG. 1 also depicts, with reference numerals 110 and 120, embodiments of the invention expressed in forms suitable for ready comparison with architecture 130. As with architecture 130, these embodiments may be implemented in the Physical layer of the seven-layer ISO/IEC reference model. In particular, a "Physical Division" or "Physical Combination" sublayer may be defined to comprise distributor/collector 100 of architecture 110.

As will be more readily apparent from the discussions that follow, architecture 110 is configured to send or receive a single communication over multiple channels at a transmission rate approximately equal to the sums of the individual channels. Architecture 120, on the other hand, is configured to pass a single communication over a single channel at approximately the overall rate of architecture 110.

As described below, distributor/collector 100 of architecture 110 may comprise one or more separate elements. In particular, in the embodiment of FIG. 1, distributor/collector 100 performs a distribution function for a communication sent from an attached computer system in order to disseminate portions of the communication across the multiple logical channels. When receiving a communication, however, distributor/collector 100 collects data from the multiple channels to re-assemble a single data stream to pass to the attached network entity (e.g., via a MAC, or Medium Access Control layer or sublayer).

In FIG. 1, distributor/collector 100 is coupled to a Reconciliation sublayer and higher layers/sublayers of the ISO/

IEC model by 10GMII 102 and to a plurality of PCS (Physical Coding Sublayers) by 2GMII 104. 10GMII 102 and 2GMII 104 differ from a GMII of architecture 120 in several aspects, as will be discussed below.

A physical layer device in architecture 120 may be viewed to encompass entities corresponding to a PHY of architecture 130 (i.e., Physical Coding Sublayer, Physical Medium Attachment, Physical Medium Dependent), except that they must operate at higher rates in order to transmit and receive multiple gigabits of information per second. A PHY of architecture 110 may also encompass similar entities, plus distributor/collector 100. Although architecture 110 comprises four separate PHYs in FIG. 1, any number may be implemented in alternative embodiments of the invention. As will be discussed in more detail below, the number of PHYs may be a factor in determining the number of logical channels employed by a high-speed Ethernet interface device according to an embodiment of the invention.

As with architecture 130, full details of a PHY may not be depicted in architectures 110 and 120. In particular, a TBI (Ten-Bit Interface) for carrying encoded data between a PCS and a PMA (Physical Medium Attachment) in architecture 130 (but not pictured in FIG. 1) also has a counterpart in architectures 110 and 120, as described below.

Medium 106, as described above, may consist of a single physical communication medium coupled to each PHY, or may comprise multiple distinct signal conductors, with each being coupled to a different PHY. Medium 106 is selected such that its topology is compatible with the Ethernet protocol and is capable of conveying signals at the rates specified in the various embodiments of the invention described below.

In the illustrated embodiment, the design and operation of 10GMII 102 and each 2GMII 104 are based on the full duplex subset of the GMII described in the IEEE 802.3 standard. During operation of the embodiment depicted in FIG. 1, distributor/collector 100 receives frames, or packets, from a Medium Access Control (MAC) layer through 10GMII 102 at a rate in excess of 1 Gbps (e.g., up to approximately 10 Gbps in the illustrated embodiment). Similarly, distributor/collector 100 operates in the reverse direction to provide a MAC layer with reconstructed frames at the same rate of transfer. This transmission rate is approximately equal to the sum of the rates at which data are transferred across the 2GMII interfaces that connect distributor/collector 100 to each PCS. Thus, in FIG. 1, each 2GMII may operate at a rate of approximately 2.5 Gbps.

The terms "frame" and "packet" may be used interchangeably herein, and generally refer to the unit of information received from or sent to a MAC layer from a physical layer device. The term "mini-frame" or "mini-packet" may be used to describe the fraction or portion of a frame that is sent across one of multiple channels.

Figure 2:
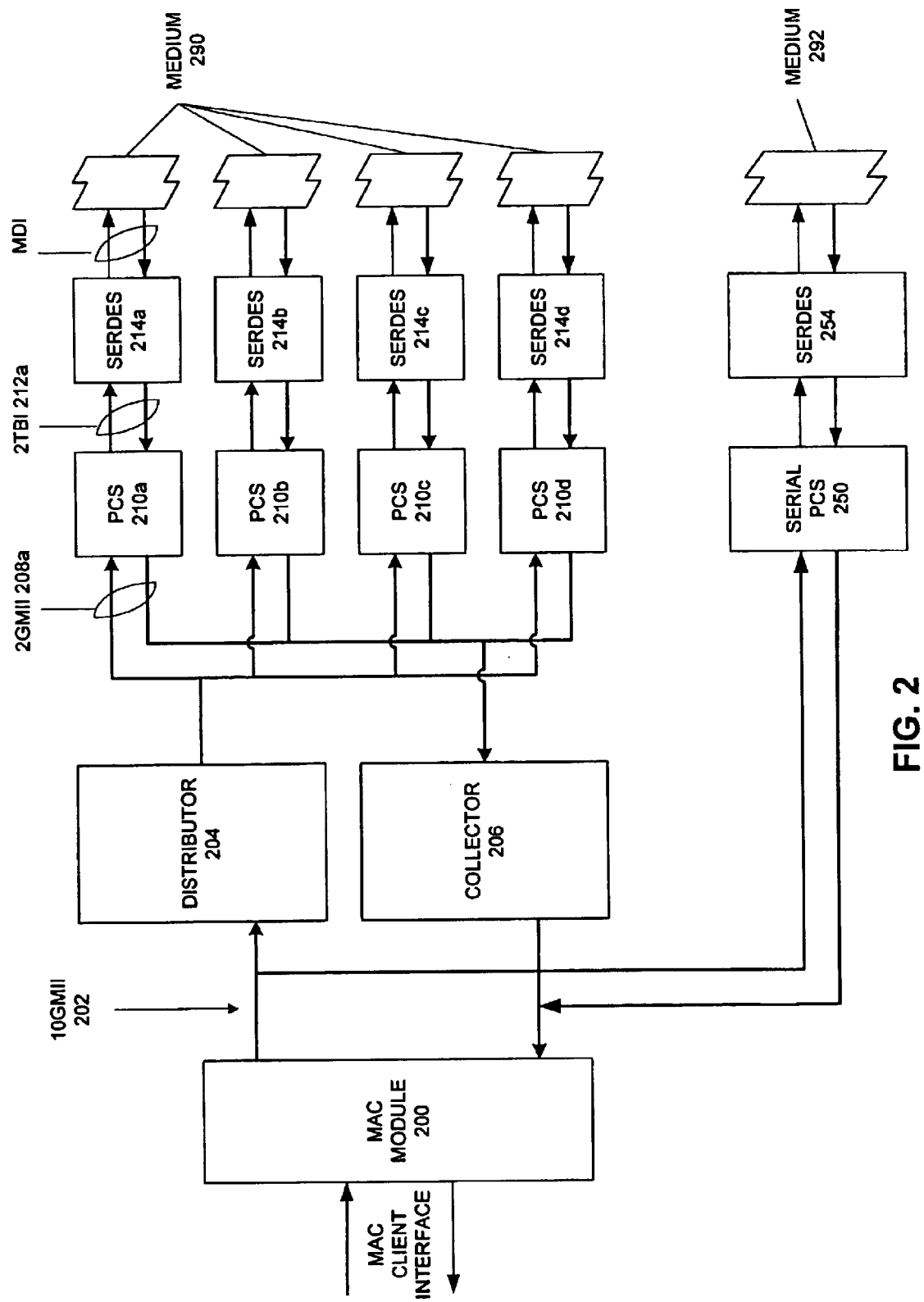
FIG. 2 is a block diagram of a portion of an Ethernet network interface device comprising one embodiment of the invention.

FIG. 2 is a block diagram of a suitable architecture for enabling a high-speed Ethernet interface to stripe data across multiple logical channels in one embodiment of the invention. The illustrated architecture may be implemented entirely within one integrated circuit or ASIC (application-specific integrated circuit), across multiple integrated circuits or within one or more printed circuit boards or other similar components. In addition, the architecture described in conjunction with FIG. 2 is intended to be media-independent, meaning that the multiple physical layer devices may connect to any type of Ethernet network, whether metallic, optical, wireless or other.

In FIG. 2, MAC (Medium Access Control) module 200 serves as an intermediary between a physical layer and higher network protocol layers of a host or client computer system in which the high-speed Ethernet interface is installed. In particular, MAC module 200 sends and receives Ethernet packets and executes the Ethernet protocol on behalf of processes operating at higher protocol layers. One skilled in the art of network interfaces will be well versed in the design, function and operation of MAC module 200. MAC module 200 in this embodiment of the invention operates similarly to existing MAC sublayers of Ethernet networks and any modifications necessary to the MAC sublayer and/or higher layers and sublayers to implement an embodiment of the invention will be evident to those skilled in the art from the following description.

MAC module 200 is coupled to distributor 204 and collector 206 via 10GMII 202. In the illustrated embodiment 10GMII 202 is configured to operate at a data rate of approximately 10 Gbps. However, in alternative embodiments of the invention the interface between MAC module 200 and distributor 204 and collector 206 may be configured to operate at other rates. In particular, one embodiment of the invention supports lower speed Ethernet configurations by supporting the transmission of information across this interface at speeds substantially below 10 Gbps (e.g., 1 Gbps, 100 Mbps, 10 Mbps, 1 Mbps). When operating at such lower speeds, an embodiment of the present invention may not be limited to full duplex operation. Embodiments of the invention may be enhanced by increasing the rate of data transfer across 10GMI 202 and/or other interfaces described below.

In the embodiment of FIG. 2, 10GMII 202 comprises thirty-two data lines in each direction and can carry four bytes at a time to and from MAC module 200. Thus, a signaling rate of 312.52 MBd is necessary in order for it to carry 10 Gbps. A clock signal operating at 156.26 MHz, in which both edges are used, enables the necessary data transfer rate. The same clock reference signal may be used for one or more of the other interfaces described below, or multiple clocks may be employed.

Distributor 204 operates upon Ethernet frames (e.g., packets) directed from the host computer system to another entity coupled to medium 290. For data traffic passing in the opposite direction, collector 206 receives and re-assembles Ethernet frames received from a network entity for a user or application (e.g., program, process) operating on the host computer system.

In particular, distributor 204 divides or apportions each frame received from MAC module 200 across multiple logical channels established between the host computer system and a network entity. Distributor 204, operating in conjunction with a collector on a receiving entity, enables an Ethernet frame or packet to be striped across multiple Ethernet channels for purposes of conveying the frame to the entity at a rate faster than any one of the individual channels.

For traffic received from medium 290, collector 206 reconstructs each frame that was striped across multiple channels. Because frame striping occurs below the Data Link level in this embodiment, MAC module 200 may require little change in operation other than the ability to send and receive frame elements (e.g., bytes) at higher speeds than for which it is presently configured. Alternative embodiments of the invention, however, may require further alteration of MAC module 200 and/or other layers or sublayers higher in the applicable network protocol stack.

The manner in which frame elements are scattered or allotted among multiple channels, and the manner in which the frames are reconstructed, are described in detail in the following section. In short, however, individual frame elements (e.g., bytes) are distributed among multiple logical channels (e.g., four in the embodiment depicted in FIG. 2) on a round-robin basis. Each channel thus carries one "mini-frame" or "mini-packet," the contents of which will be reunited with those of the other mini-frames at the receiving entity.

Another type of interface, a first of which is depicted as 2GMII 208*a*, is also shown in FIG. 2. The configuration of this interface in a particular embodiment of the invention may be determined by, or may determine, the number of logical channels available to the computer system. Illustratively, a 2GMII interface comprises eight data lines in each direction and couples distributor 204 and/or collector 206 to one physical layer device or Physical Coding Sublayer (PCS). In order for the combined 2GMIIs to carry the same amount of data as 10GMII 202, each 2GMII, including 2GMII 208*a*, may operate at the same signaling rate as 10GMII 202. The same clock frequency used by 10GMII 202 (e.g., 156.26 MHz), again sampled on both edges, may be used to achieve the necessary 312.52 MBd signaling rate. During operation of this embodiment, therefore, each 2GMII may carry approximately 1/N of the information carried on 10GMII 202, where N is the number of channels. In the illustrated embodiment in which four logical channels are depicted, 2GMII 208*a* and the other 2GMIIs each carries approximately 2.5 Gbps in each direction.

In one embodiment of the invention it is necessary for each 2GMII to operate at or near peak efficiency (e.g., at approximately 2.5 Gbps) in order for 10 GMII 202 to be capable of its optimal data transfer rate. An Ethernet interface employing this embodiment may therefore cease functioning, enter an error recovery procedure or take other diagnostic or corrective action in the event that 2GMII 208*a* or another 2GMII ceases to carry data or operates in a degraded fashion. In another embodiment of the invention, however, distributor 204 and collector 206 may alter their operation to use fewer logical channels (e.g., by halting the exchange of data over one or more logical channels) or otherwise reduce their operation speed (e.g., by slowing the exchange of data over one or more logical channels).

Multiple PCS modules (depicted by reference numerals 210*a*–210*d*) perform coding of Ethernet frame elements in substantially the same manner as existing Gigabit Ethernet implementations. As depicted in FIG. 2, one PCS module is incorporated for each logical channel connected to distributor 204 and collector 206. In the illustrated embodiment of the invention, the PCS modules perform 8B/10B coding as in the present IEEE 802.3 Gigabit Ethernet standard. Thus, each byte received from distributor 204 is translated by a PCS module into a 10-bit code that is subsequently signaled across network 290. At a receiving entity, a PCS module decodes the mini-frame received on its channel and provides the recaptured bytes to a collector.

PCS modules 210*a*–210*d* are coupled to Serializer/Deserializers (SERDES), which may be considered Physical Medium Attachment (PMA) devices and which are identifiable by the reference numerals 214*a*–214*d*, by a Ten Bit Interface that may be adapted from an existing Gigabit Ethernet architecture. Illustratively, however, the new Ten Bit Interface (one of which is depicted as 2TBI 212*a* in FIG. 2) is configured for the same signaling rate and clock speed as 10GMII 202 and 2GMII 208*a* and operates at approximately 2.5 times the rate of a TBI in an existing Gigabit Ethernet architecture. In an alternative embodiment in which the Ethernet interface operates at transmission rates above or below those described here, the communication rates of 10GMII 202, 2GMII 208*a* and 2TBI 212*a* may be altered accordingly. In the embodiment of FIG. 2, each SERDES is coupled to a suitable Ethernet communication medium by a Medium Dependent Interface (MDI), possibly through a PMD (Physical Medium Dependent) module.

As described previously, an embodiment of the present invention achieves a high data transfer rate (e.g., approximately 10 Gbps) by striping data across multiple logical channels. However, embodiments of the invention are also compatible with high-speed Ethernet interfaces that communicate across single channels. Naturally, however, such single channels must operate at higher data transfer rates than multiple channels that act cooperatively.

FIG. 2 therefore also demonstrates that the illustrated embodiment can be extended to cooperate with PCS 250 to communicate with medium 292 via a single channel rather than multiple logical channels. In particular, PCS 250 is coupled to MAC module 200 via a 10GMII and communicates with SERDES 254 over a suitable interface operating at the necessary rate to exchange 10 Gbps. SERDES 254 is coupled to medium 292 via a MDI that operates at a rate necessary for a single channel mode of operation.

As one skilled in the art will appreciate, striping data across multiple channels may be performed at different levels of a network protocol stack. For example, if implemented above the MAC layer (e.g., as with 802.3 link aggregation) multiple network "flows" or "conversations" must be distributed and collected and almost all of the network interface hardware used for present Ethernet implementations must be duplicated. In addition, the speed of an individual flow during such "flow striping" is limited to the speed of an individual channel.

In contrast, one or more embodiments of the invention discussed herein perform striping of network data at a lower level in the network protocol stack. In particular, in the embodiment of FIG. 2 the point at which network data diverges across multiple logical channels (and is re-assembled at a destination) is located below the MAC layer (e.g., within the Physical layer). Because striping is done with the contents of individual MAC frames or packets in these embodiments, only Physical layer resources need to be duplicated.

One of the benefits of striping a data stream across multiple channels is that the buffering requirements of the receiving entity are reduced. In particular, each channel receives only a fraction of the data stream and only needs to be buffered to the extent required to synchronize the channel with the other channels. Another benefit is that the increased transmission rate achieved with an embodiment of the invention is enabled by incremental improvements employed in each individual channel. In other words, rather than increasing the operating capabilities of all interface elements to run at 10 Gbps instead of 1 Gbps, most elements need only be capable of processing data at a fraction of 10 Gbps.

One or more embodiments of the invention discussed below utilize four logical channels to communicate across a dedicated Ethernet medium. One skilled in the art will readily perceive how these embodiments may be modified to use more or fewer channels. The use of any plurality of channels, two or higher, is envisioned in alternative embodiments of the invention. Illustratively, however, with four channels each channel may operate at a signaling rate of approximately 3.125 GBd to allow the overall data transfer rate to reach 10 Gbps.

In a present embodiment of the invention a maximum skew (e.g., propagation delay) between the multiple channels must be specified. The skew may be relatively large or small, but some maximum value must be specified. By specifying a maximum expected skew, this embodiment may be configured as described below to operate properly as long as the actual skew encountered during operation is no greater than that which was specified. One skilled in the art will recognize that a suitable maximum skew may be determined by ascertaining the difference in the propagation delays encountered across the multiple logical channels and/or the different physical or operating characteristics of the links over which the logical channels are carried.

One advantage of operating with a specified maximum skew value is that the distributor of a first network entity that is sending data to a second network entity need not consider the skew encountered at the receiving entity (i.e., it nay operate as an "open loop"). At the receiving entity, a buffer may be applied to one or more channels to offset the actual skew. The amount of buffering may be proportional to the specified maximum skew. As one skilled in the art will appreciate, a maximum expected skew may be derived or measured from the desired length of a network segment. Alternatively, a particular desired maximum skew value may determine the maximum length of a network segment.

In one embodiment of the invention a distributor (e.g., distributor 204 of FIG. 2) accepts a stream of bytes from a MAC module or layer (e.g. a frame), and distributes individual bytes into sub-streams (e.g., mini-frames) in a round-robin fashion. As depicted in the embodiment of FIG. 2, four channels may be implemented with a 10GMII that is four bytes wide; therefore, each time the distributor receives another four bytes, one byte is submitted to each channel. In this manner, an Ethernet frame is divided into four mini-frames for transmission across a different channel.

Transmission of a frame may begin on any of the four channels but the bytes of the frame are distributed in round-robin fashion thereafter. In other words, a first byte of a frame may be sent on channel X, after which channel X will also carry bytes 5, 9, 13, etc., and the next channel in sequence will carry bytes 2, 6, 10, etc. Just as a frame may commence on any channel, the channel it ends on is determined by the length of the frame. In this embodiment, Ethernet framing characteristics are maintained and may be supplemented as necessary and as described below.

On the receiving entity, the collector continuously monitors each channel and attempts to synchronize them using sequencing information received during idle periods between packets. Until all channels are synchronized and the collector starts receiving mini-frames from the same frame on all channels, the collector reports an idle condition to the MAC module or layer. Once the channels are synchronized and begin delivering data belonging to the same packet, the collector accepts one byte at a time from each channel, again in round-robin fashion, re-assembles them and forwards the byte stream to the MAC. As described below, the first and last bytes of each frame and mini-frame are marked so that they are easily recognized.

As already described, a buffer may be employed for each channel, and may be proportional in size to the worst expected skew between channels. Thus, even if the actual skew exceeds the transmission or propagation time of a byte, several bytes or even a full mini-frame, the collector may still successfully re-assemble a packet.

Because of the manner in which a frame is distributed across the multiple channels (e.g., byte-by-byte), each mini-frame should consist of approximately one fourth of the original frame in the presently described embodiment. This allows a unique method of error detection on a receiving entity. In particular, a counter may be used to count the number of bytes received over each channel for a particular frame. If the number of bytes received over one channel differs from another channel by more than one, it may be determined than an error has occurred. Error correction may then be initiated, for example, by notifying the MAC of the receipt of an invalid frame.

Each mini-frame received from the distributor by a PCS is "framed" and encoded in a manner similar to the way full Gigabit Ethernet packets are framed and encoded in previous Gigabit Ethernet implementations. In particular, in one embodiment of the invention a PCS module applies the 8B/10B coding scheme to encode or decode each data sub-stream received from the distributor or a physical link, respectively. Other coding schemes (e.g., 4B/5B, NRZI, etc.) may be used in alternative embodiments of the invention. Because of the architecture of a present embodiment, however, some alterations may be required to a coding scheme.

For example, the round-robin distribution of frame bytes among the four channels may result in a channel receiving only a single byte of the frame's Preamble field, which is normally seven bytes in length. In particular, in existing Ethernet architectures one byte of each frame's Preamble field is replaced by a Start of Packet Delimiter (SPD) symbol during encoding. In addition, Inter-Packet Gaps (IPG) are encoded such that each Idle symbol of the gap is translated into a set of two codes. Therefore, depending on the timing of a new frame or mini-frame, a channel's mini-frame could conceivably lose its first Preamble byte because of the need to finish sending an Idle (i.e., the second Idle code). If a channel has only one Preamble byte and loses it to the Idle extension, it will not have a Preamble byte that can be replaced by the SPD symbol. One solution to this problem is to modify the coding scheme such that Idle symbols do not require multiple codes at the expense of the Preamble. Another solution is to increase the size of the Preamble generated by the MAC to eight (or more) bytes. Yet other solutions may be perceived by those skilled in the art.

Another consequence of implementing an embodiment of the invention (e.g., the embodiment of FIG. 2) is encountered when distributing the IPG, which is normally a minimum of twelve bytes, among multiple channels. In the embodiment of FIG. 2, for example, a minimum-size IPG results in an inter-mini-frame gap on each channel of only three bytes. Present coding schemes allow for an End of Packet Delimiter (EPD) of up to three bytes/codes. Thus, if the maximum-size EPD is used with a minimum-size IPG, the channels may not receive any Idle codes with which to synchronize. Among the solutions to this situation is the use of an EPD consisting of only one code, or at most two. Another solution is to increase the size of the minimum IPG.

To assist in the synchronization of channels by a collector, in one embodiment of the invention several enumerated Idle symbols are applied. These symbols may be represented as Idle1, Idle2, . . . , IdleN. The number of different Idle symbols may be limited by the coding scheme but a range of 64 or even 128 is envisioned in alternative embodiments of the invention. Illustratively, the same Idle symbol is transmitted across each of multiple channels and changes with each MAC frame. Thus, the IPG between a first MAC frame and a second MAC frame may be marked by IdleX, the IPG between the second and third frames may be marked by IdleX+1, etc.

Also, for effective demarcation of the beginning and end of each frame and mini-frame, an additional set of delimiters is applied in one embodiment of the invention. In this embodiment, a Start of Packet Delimiter (SPD) and End of Packet Delimiter (EPD) are inserted at the beginning and end, respectively, of each packet received at a distributor from a MAC layer. Thus, the SPD and EPD symbols may be used similarly to existing Ethernet architectures. A new set of delimiters, which may be termed Start of Mini-frame Delimiter (SMD) and End of Mini-frame Delimiter (EMD), are used to mark the beginning and end of each mini-frame that is not marked with the SPD or EPD symbols. Thus, regardless of which channel a packet begins or ends on, the mini-frame that initiates the packet will begin with a SPD code and the mini-frame that completes the packet will end with a EPD code. The other mini-frames will begin with the SMD code and end with the EMD code.

Figure 3A:
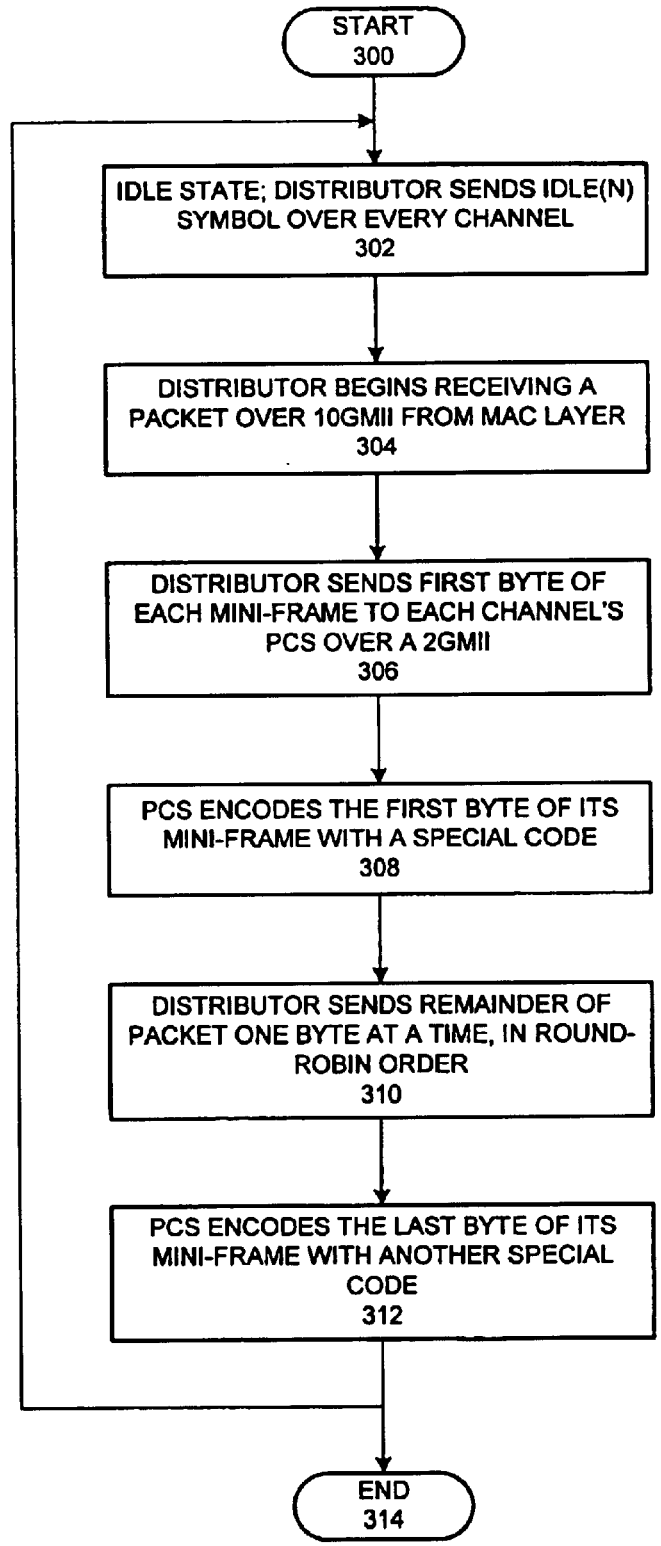
FIG. 3A is a flowchart demonstrating one manner of distributing a packet across multiple channels in accordance with one embodiment of the invention.
Figure 3B:
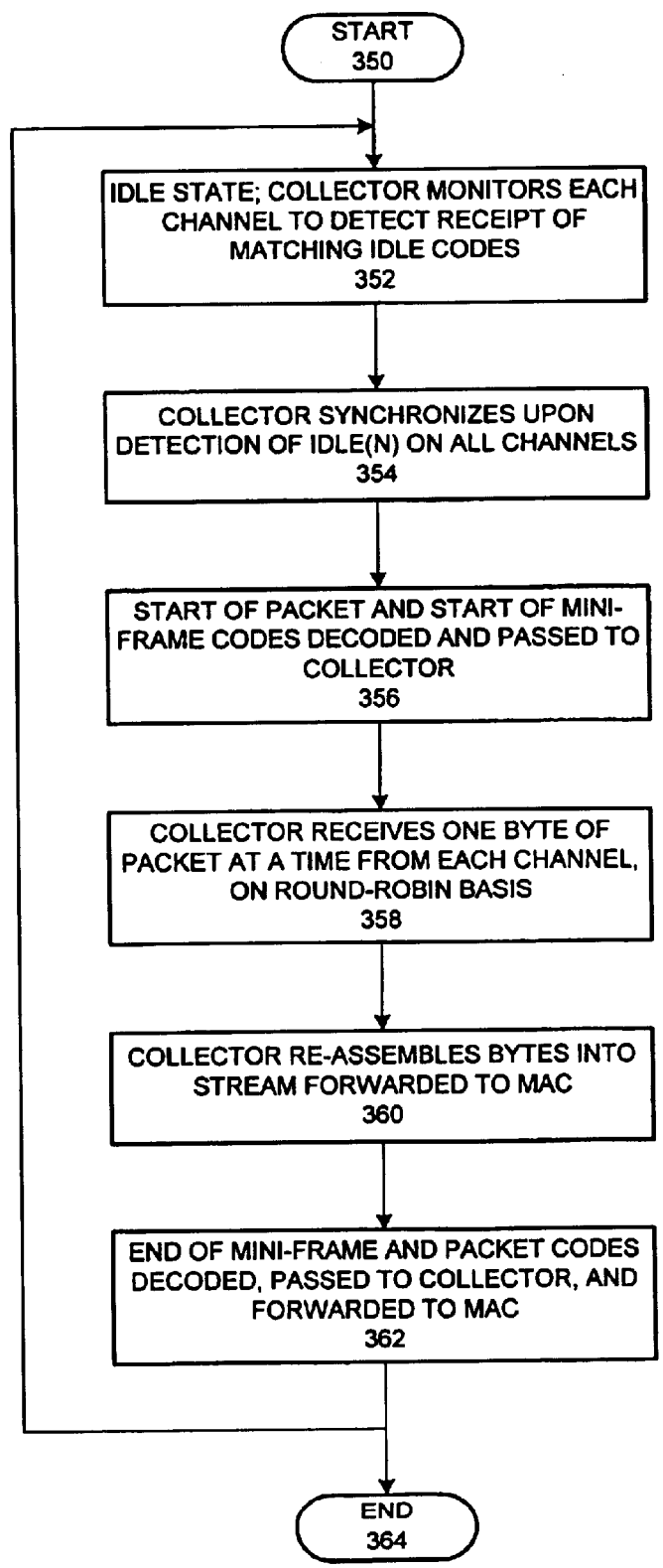
FIG. 3B is a flowchart demonstrating one manner of collecting a packet transmitted across multiple channels in accordance with one embodiment of the invention.

FIGS. 3A–3B are flowcharts demonstrating one method of transmitting a packet (FIG. 3A) and one method of receiving a packet (FIG. 3B) across multiple channels in one embodiment of the invention. For purposes of FIGS. 3A–3B, an Ethernet interface device as described above is configured to transmit and receive data at a rate of approximately 10 Gbps in each direction by striping each packet across four logical channels.

State 300 is a start state in FIG. 3A. State 302 is an idle state, characterized by a lack of packet data flowing from a MAC layer or module to a distributor in the Ethernet interface device. The distributor indicates an idle state by transmitting appropriate idle symbols or bytes on each of the four channels. In particular, however, the distributor sends the same idle symbols to each channel's PCS, which idle symbol is but one of several different symbols. As described elsewhere, although the same idle symbol is generally sent over each channel at the same time, by varying which symbol is sent during each idle period a collector in a receiving Ethernet interface device may be able to synchronize the channels more easily. Upon receipt of each idle symbol by a PCS, the PCS encodes the symbol as a ten-bit code and forwards it for signaling across a suitable Ethernet medium.

In state 304, the distributor begins receiving a packet from a MAC. The distributor may detect the beginning of a packet by a change in state of the TX_EN signal line. In this embodiment, the interface coupling the MAC and distributor is thirty-two data bits wide and therefore delivers up to four bytes at a time at a rate of approximately 10 Gbps. Thus it occurs that in this embodiment a byte may be transmitted across a channel each time another set of four bytes is received from the MAC.

In state 306 the distributor sends the first byte of each channel's mini-frame to a PCS for encoding.

In state 308 each PCS encodes its first byte with a special code. In particular, the first byte of the entire packet, regardless of which channel or mini-frame it traverses, is translated into a code that will be understood by the receiving station to indicate the start of a new packet. The initial bytes of the other channels are similarly encoded (with different codes) to indicate their status as the initial bytes of a new mini-frame.

In state 310, the remainder of the packet is received by the distributor, distributed one byte at a time (in round robin fashion) to each channel, encoded, and transmitted.

In state 312, the final bytes of the four mini-frames, including the last byte of the packet, are also translated into special codes that will be recognized by the receiving entity. In particular, the final byte of each mini-frame that does not carry the final byte of the packet is encoded with a first ending code and the final byte of the entire packet is encoded with another distinctive code. The illustrated procedure then ends at state 314.

In FIG. 3B one procedure for receiving the packet sent in the procedure of FIG. 3A is depicted. In FIG. 3B state 350 is a start state. State 352 is an idle state, meaning that the receiving entity's collector that is coupled to the same Ethernet medium used to transmit the packet discussed in FIG. 3A receives no data over the medium. In particular, as long as the collector is unable to synchronize the communication channels (e.g., receive at least one of the same idle codes over each of the four channels) it may act as if it is not receiving any traffic.

In state 354, however, the collector is able to synchronize the channels by detecting the same idle code on all four channels. As described previously, an elasticity buffer may be employed on one or more channels to account for channel skew or other propagation delay. Now that the collector has synchronized, it will expect each channel to begin delivering portions of a single packet.

In state 356, the Physical Coding Sublayer for each channel in the receiving device receives a first code of a mini-frame sent from the transmitting entity. The first codes of each mini-frame will be recognized by their distinctive codes, as discussed above. By determining which channel the first byte of the packet was received on, the collector may determine the appropriate order for reading the remaining bytes (in round-robin fashion) of the packet.

Thus, in states 358–360 the collector receives one byte at a time on each channel and forwards them to a MAC in the correct order. Therefore, the packet's contents reach the receiver's MAC in the same order they were dispatched by the sender's MAC.

In state 362 the last byte of each mini-frame and the last byte of the packet are recognized by their distinctive codes. Illustratively, just as the PCS modules in the sending Ethernet interface device constructed the ending delimiters in place of idle symbols, the PCS modules of the receiving device may translate the ending delimiters back into idle symbols. The illustrated procedure then ends at state 364.

Figure 4:
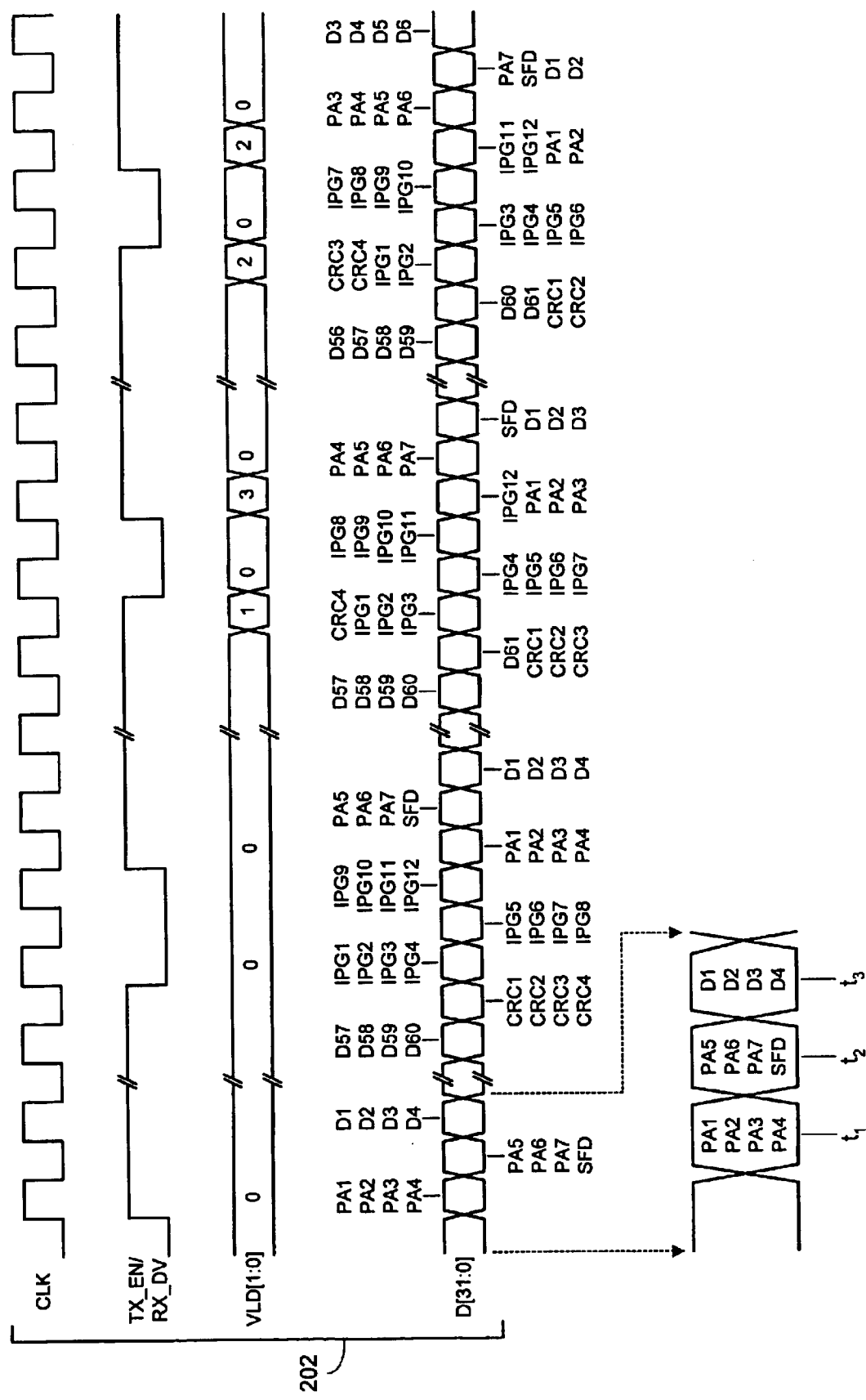
FIG. 4 depicts the transfer of a data stream comprising multiple Ethernet frames over a multi-Gigabit per second interface in accordance with one embodiment of the invention.
Figure 5A:
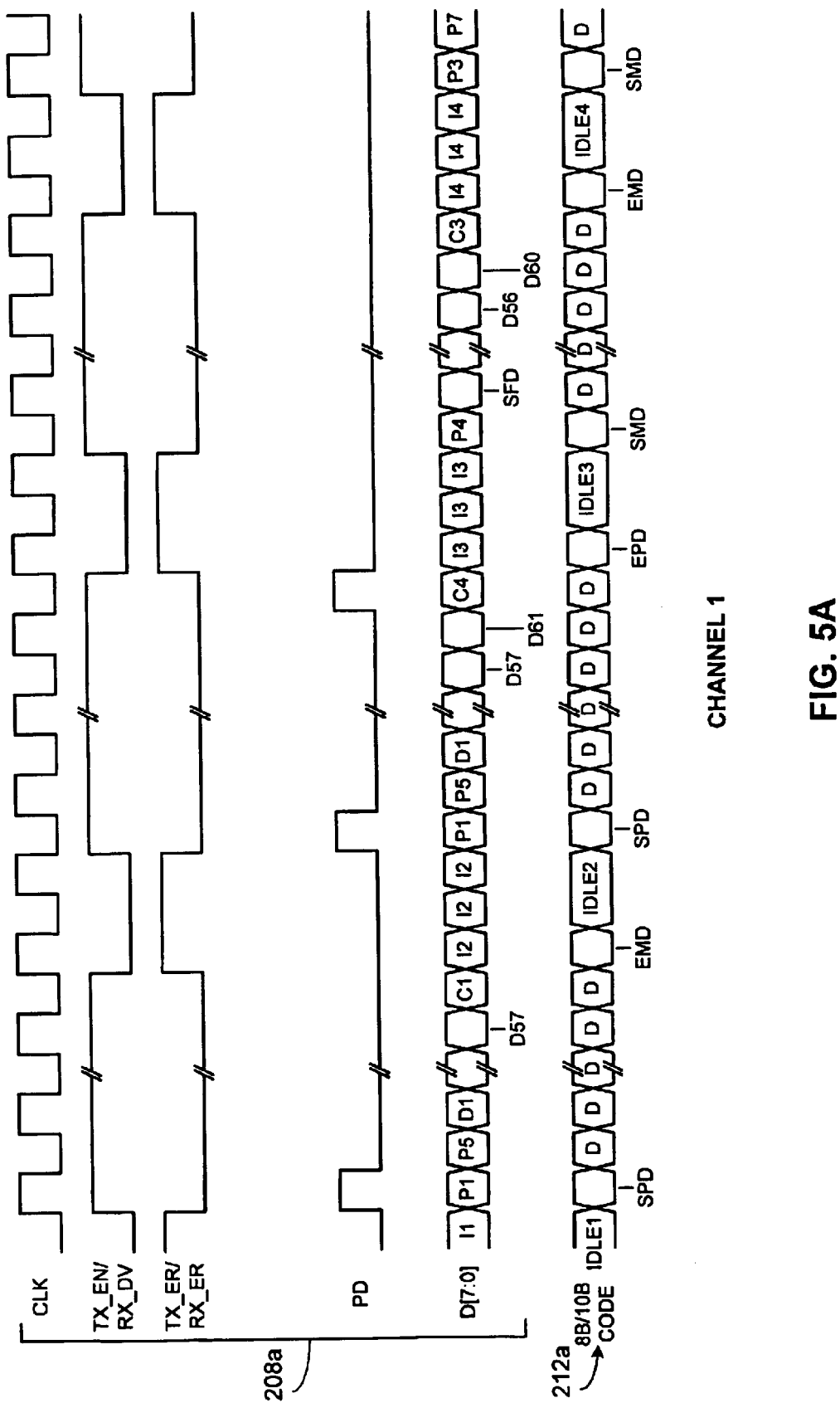
FIGS. 5A–5D demonstrate the division of the data stream of FIG. 4 across multiple channels in accordance with an embodiment of the present invention.
Figure 5B:
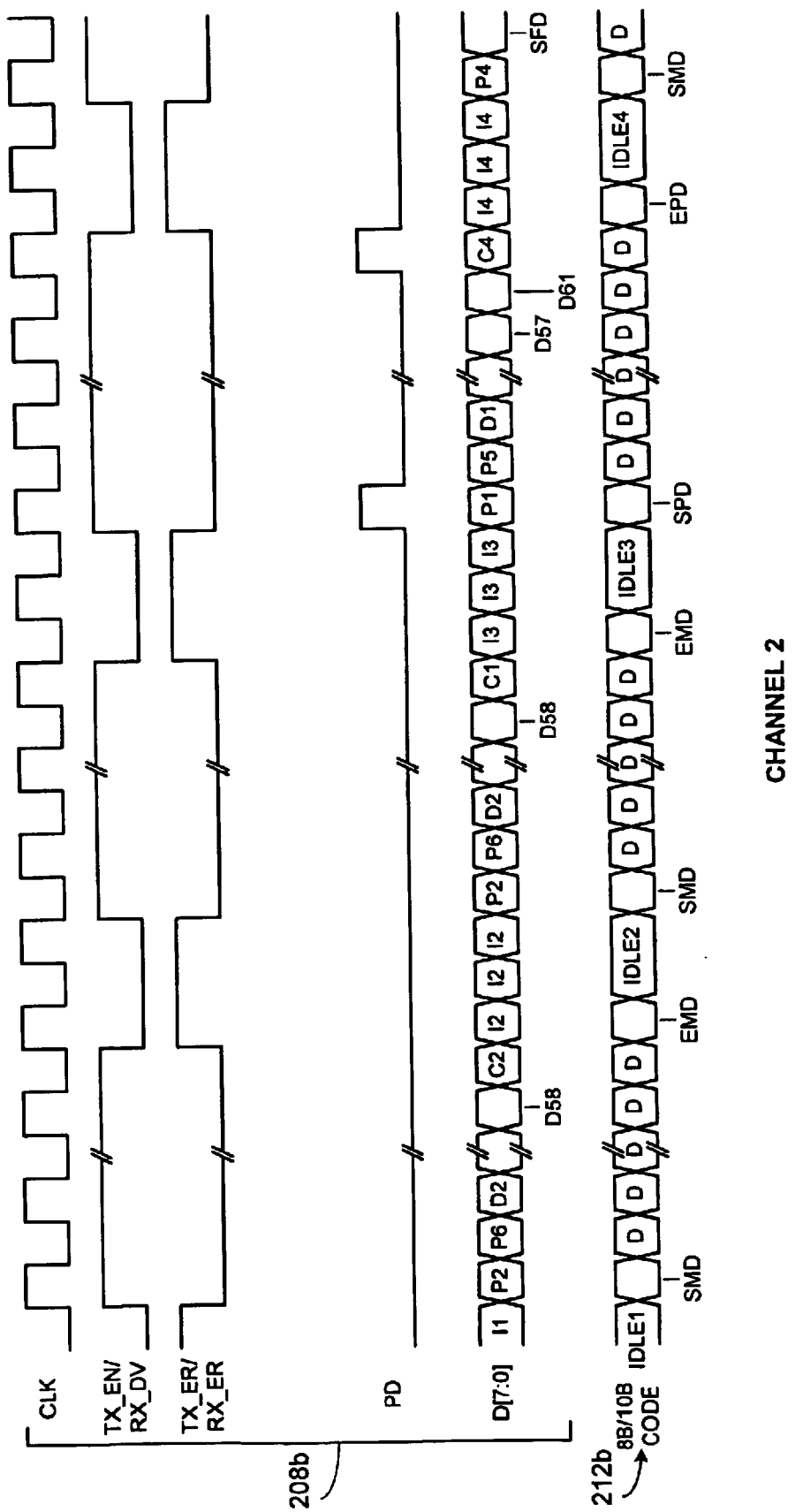
Figure 5C:
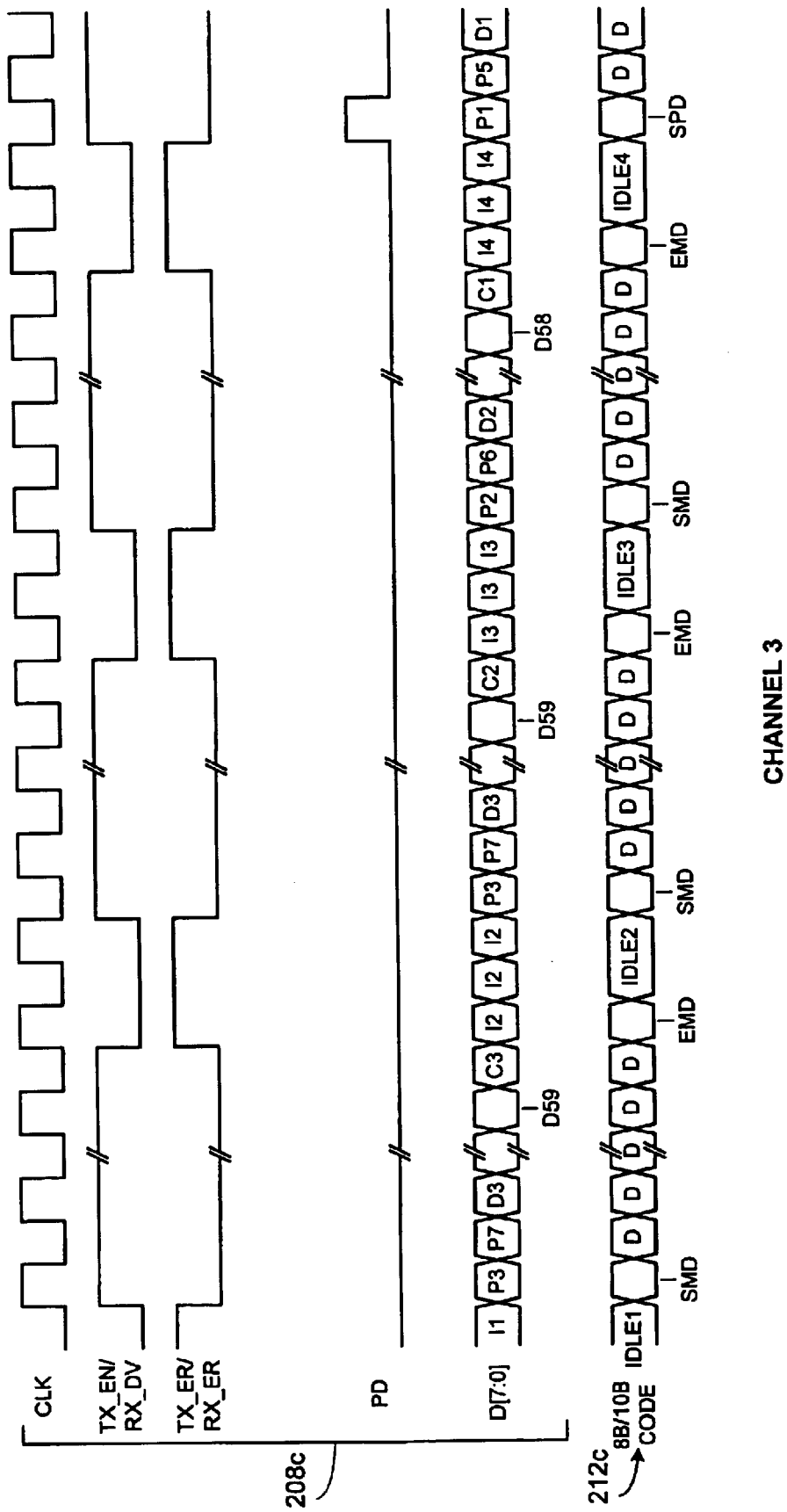
Figure 5D:
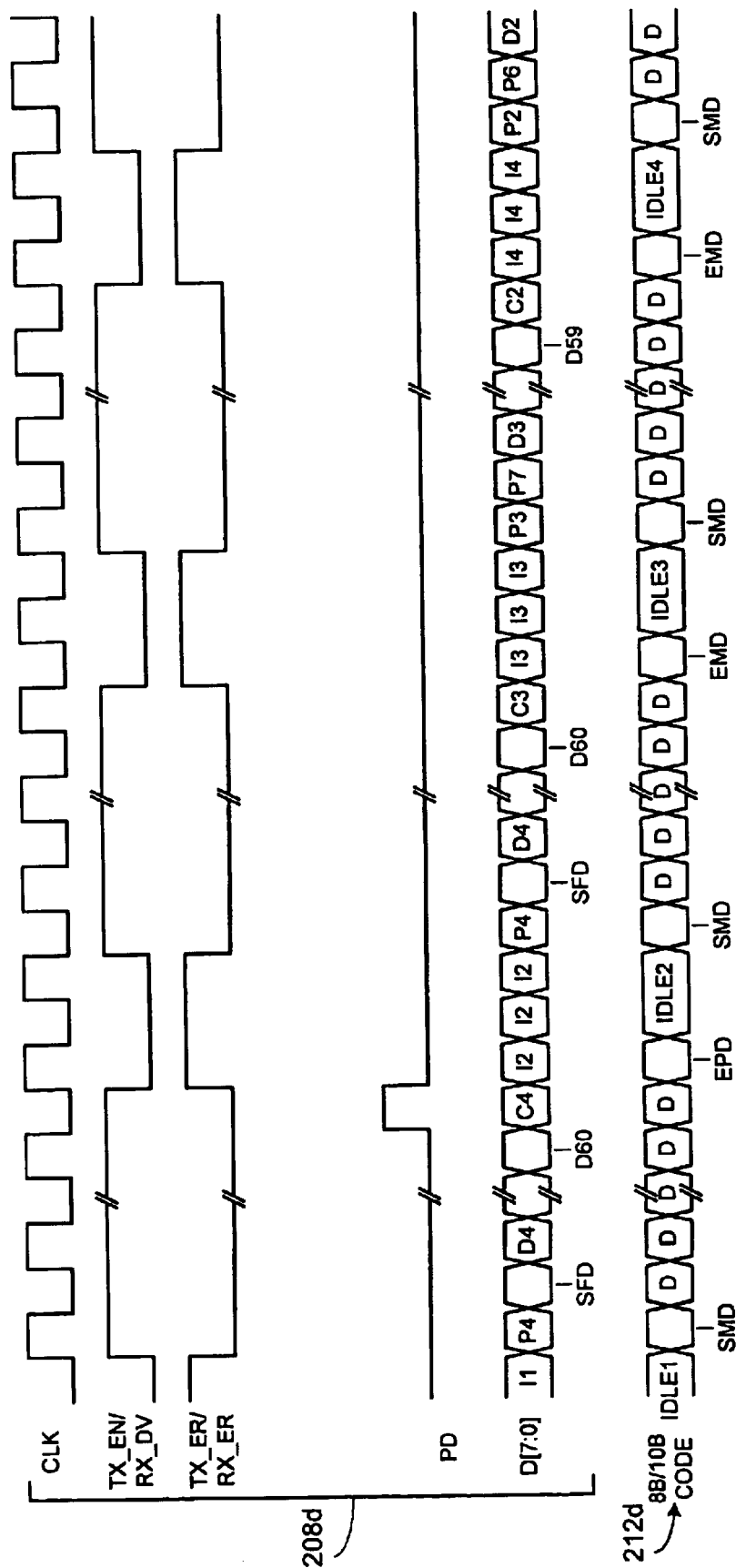

FIG. 4 depicts in one embodiment of the invention the transfer, across 10GMII 202 of FIG. 2, of a packet sixty-four bytes in length (e.g., sixty data bytes plus four CRC (Cyclic Redundancy Check) bytes), followed by multiple packets that are sixty-five bytes long. The other three buses depicted in FIG. 4 are the Clock bus, Transmit_Enable (TX_EN)/Receive_Data_Valid (RX_DV) bus and Valid (VLD) bus. As one skilled in the art will appreciate, the TX_EN bus couples a MAC layer and a distributor in a first network entity that is transmitting the packets and the RX_DV bus couples a MAC layer and a collector in a second network entity that on the receiving end of the packets. Collision and Carrier Sense signals are not included in the illustrated embodiment because it operates in full duplex mode.

The VLD bus, which operates in both directions, indicates the number of valid bytes being transferred across the data bus (e.g., 10GMII 202) from MAC module 200 to distributor 204 or from collector 206 to MAC module 200. The VLD bus can be limited to a width of two lines by interpreting its state in conjunction with that of TX_EN or RX_DV (depending upon the direction of data transfer). In particular, and as will be better understood from the following discussion of the data bus, a non-zero value on the VLD bus is meaningful when TX_EN or RX_DV is asserted. And, when either of these buses is asserted, a zero value on the VLD bus indicates that four valid bytes are transiting the data bus; otherwise, a zero value on the VLD indicates that the data bus is idle (i.e., carries no data).

On 10GMII 202, four bytes are conveyed at a time. Thus, at time $t_1$ in FIG. 4 the first four preamble bytes of a first packet are sent. At time $t_2$, the other three Preamble field bytes and a Start of Frame Delimiter (SFD) symbol are sent; at time $t_3$ the first four data bytes are sent, etc.

FIG. 4 demonstrates the transfer of data on both edges of the clock signal. An examination of the VLD bus in conjunction with the TX_EN/RX_DV and data buses shows how the VLD bus may transition from a zero value to a non-zero value and back to a zero value at the beginning and end of each MAC frame.

FIGS. 5A–5D depict the conversion of the frames depicted in FIG. 4 into multiple mini-frames for transmission across separate channels in accordance with one embodiment of the invention. In particular, the data stream conveyed from a MAC to a distributor across 10GMII 202 in FIG. 4 is distributed across 2GMIIs 208a, 208b, 208c and 208d in FIGS. 5A–5D. Also, 2TBIs 212a, 212b, 212c and 212d carry the encoded bytes from each PCS. For reference purposes, a Clock signal (operating at the same frequency as in FIG. 4), the TX_EN/RX_DV buses and TX_ER (Transmit Error)/RX_ER (Receive Error) buses are also depicted in FIGS. 5A–5D.

As shown in FIGS. 5A–5D, each 2GMII is eight bits in width, both edges of the clock signal are used for data transfer and Collision and Carrier Sense signals may be omitted because of the full duplex operation of this embodiment. A Packet Delimiter (PD) signal is added in each direction (i.e., from a distributor to each PCS and from each PCS to a collector) in order to identify the first and last bytes of a MAC frame. Thus, the start of a packet may be signaled by raising the PD and TX_EN signals and the end of a packet may be signaled by lowering the same signals. Each 2TBI is ten bits in width and both edges of the clock signal are again used for data transfer.

For purposes of illustration, in FIGS. 5A–5D bytes transiting the 2GMII buses are identified slightly differently than in FIG. 4. In particular, IPG codes or Idles are represented by the letter "I," PA (Preamble) is represented by the letter "P," and CRC is depicted by "C." Each of these characters is modified by a numeral that increases in sequence. Thus, the seven Preamble bytes of a frame, the four CRC bytes, and the various Idle symbols may be easily identified.

Each mini-frame in FIGS. 5A–5D is preceded by an identical Idle symbol (e.g., Idle1 before the first packet). Illustratively, after each successive packet is conveyed a different Idle symbol is used for the inter-packet gap. Thus, in the embodiment of FIGS. 5A–5D a coding scheme is adopted in which a minimum of four different Idle symbols are required.

The error detection and handling abilities of various embodiments of the invention may take advantage of the unique properties of the architecture described above. For example, because the mini-frames that comprise a packet should never differ in length by more than one byte, a collector may detect an invalid packet by comparing mini-frame lengths. Also, because the channel skew is bounded (e.g., by the specified maximum expected skew), if a channel buffer overflows then it is likely that a channel or physical link is faulty or out of specification or that some other error has occurred to cause a mini-frame to be delayed or corrupted.

Channel synchronization errors may be detected by the collector using the sequence information signaled between packets (e.g., the different Idle codes). The greater the number of different Idle codes employed, the larger the number of consecutive mini-frames that must be lost or injected on a channel in order for a sequencing error to pass undetected. With a large enough variety of Idle codes, a channel buffer may overflow before the synchronization error can affect the flow of data, thus providing another level of error resistance.

Individual bit errors that result in the corruption of a packet's data will be detected and handled at the MAC level (e.g., by a CRC computation) after re-assembly of mini-frames by a collector. Other errors, such as those associated with coding violations, framing errors, disparity errors and the like may be detected at the PCS level. In particular, for each packet (e.g., set of mini-frames) received at a collector, the collector may be notified if an error was detected in processing any of the packet's mini-frames (e.g. through its respective PCS). Thus, an error in one mini-frame of a packet may be imputed to the entire packet.

Channel synchronization errors not detected by the collector—such as the loss or insertion of multiple mini-frames in a channel—will be detected by the MAC since they will result in a very large number of CRC errors with no other errors present (e.g., such as framing, coding, parity). Recovery from these types of errors may involve the use of link re-initialization or 802.3 flow control to stop transmission from the remote end for a short period of time. This will automatically cause all of the channels to resynchronize.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of transmitting a communication from a first network entity to a second network entity, wherein the first network entity and the second network entity are coupled to a communication medium, comprising:

receiving a communication from a process operating on a first network entity, wherein the communication is directed to a second network entity;

receiving said communication at a distribution module of a network interface device from a medium access control module across a first interface, wherein said distribution module is configured to distribute portions of said communication among a plurality of communication channels;

distributing elements of said communication into multiple portions, each said portion corresponding to one of a plurality of channels established to convey a communication between said first network entity and said second network entity;

encoding a first portion of said communication with a first starting delimiter;

encoding a second portion of said communication with a second starting delimiter, wherein said second starting delimiter is different from said first starting delimiter;

sending said first portion of said communication on a first channel established on a first communication medium coupled to said first network entity and said second network entity; and sending said second portion of said communication on a second channel established on a second communication medium coupled to said first network entity and said second network entity;

wherein said communication is transmitted to said second entity at a data rate in excess of one gigabit per second.

2. The method of claim 1, wherein said communication is an Ethernet frame and wherein each of said multiple portions of said communication comprises one or more bytes.

3. A method of transmitting a communication from a first network entity to a second network entity, wherein the first network entity and the second network entity are coupled to a communication medium, comprising:

receiving a communication at a distribution module of a network interface device from a medium access control module across a first interface, wherein said distribution module is configured to distribute portions of said communication among a plurality of communication channels;

distributing elements of said communication into multiple portions;

sending a first portion of said communication on a first channel established on a first communication medium coupled to said first network entity and said second network entity; and sending a second portion of said communication on a second channel established on a second communication medium coupled to said first network entity and said second network entity.

4. The method of claim 3, wherein said first interface is configured to convey said communication at a data rate exceeding one gigabit per second.

5. The method of claim 3, in which said sending a first portion of said communication comprises forwarding an apportionment of said communication elements to a first physical coding module across a second interface; and wherein said first physical coding module is configured to encode said apportionment of communication elements into a series of codes for transmission over said first communication medium.

6. The method of claim 5, wherein said first physical coding module:

encodes a first element of said apportionment with a first start code if said first element is the first element of said communication and otherwise encodes said first element of said apportionment with a second start code; and encodes a last element of said apportionment with a first end code if said last element is the last element of said communication and otherwise encodes said last element of said apportionment with a second end code.

7. The method of claim 5, wherein said second interface is configured to convey said first apportionment at a data rate exceeding one gigabit per second.

8. The method of claim 3, in which said distributing comprises allotting elements of said communication among a plurality of channels established to convey a communication between said first network entity and said second network entity.

9. The method of claim 8, wherein each of said channels is configured to traverse a separate physical communication link.

10. The method of claim 8, wherein each of said channels is configured to traverse a common physical communication link, said common physical communication link comprising said first communication medium and said second communication medium.

11. The method of claim 3, wherein:

one of said first portion of said communication and said second portion of said communication includes a first start symbol configured to indicate a start of said communication and the other of said first portion and said second portion includes a second start symbol configured to indicate a start of a portion of said communication; and one of said first portion of said communication and said second portion of said communication includes a first end symbol configured to indicate an end of said communication and the other of said first portion and said second portion includes a second end symbol configured to indicate an end of a portion of said communication.

12. The method of claim 3, further comprising:

transmitting a first idle signal on said first channel and said second channel prior to said receiving; and transmitting a different idle signal on said first channel and said second channel after said sending a second portion of said communication.

13. The method of claim 3, further comprising:

encoding the first element of said first portion of said communication with a first starting delimiter; and encoding the first element of said second portion of said communication with a second starting delimiter.

14. The method of claim 13, further comprising:

encoding the last element of said first portion of said communication with a first ending delimiter; and encoding the last element of said second portion of said communication with a second ending delimiter.

15. A method of receiving a communication at a second network entity from a first network entity, wherein the first network entity and the second network entity are coupled to a dedicated communication medium, comprising:

receiving at a second network entity a first idle code on each of multiple channels established between a first network and said second network entity;

receiving at said second network entity a first portion of a communication from said first network entity on a first channel of said multiple channels;

receiving at said second network entity a second portion of said communication on a second channel of said multiple channels;

collecting an element of said first portion and an element of said second portion;

receiving at said second network entity a second idle code, different from said first idle code, on each of said multiple channels; and forwarding said communication toward a process operating on said second network entity.

16. The method of claim 15, wherein said communication is an Ethernet frame.

17. The method of claim 16, wherein said first portion of a communication comprises:

a first start signal configured to indicate a beginning of said communication; and a first set of elements of said communication.

18. The method of claim 17, wherein said second portion of a communication comprises:

a second start signal configured to indicate a beginning of a portion of said communication, said second start signal differing from said first start signal; and a second set of elements of said communication.

19. The method of claim 15, wherein said first communication channel and said second communication channel traverse a common communication medium.

20. The method of claim 15, herein said first communication channel and said second communication channel traverse separate physical mediums.

21. The method of claim 15, in which said collecting comprises:
receiving at a collection module an element of said first communication portion and an element of said second communication portion; and
combining said element of said first communication portion and said element of said second communication portion.

22. A method of receiving a communication at a second network entity from a first network entity, wherein the first network entity and the second network entity are coupled to a dedicated communication medium, comprising:
receiving at a second network entity a first portion of a communication from a first network entity on a first channel established between said first network entity and said second network entity;
receiving at said second network entity a second portion of said communication on a second channel established between said first network entity and said second network entity;
receiving at a collection module an element of said first communication portion and an element of said second communication portion;
combining said element of said first communication portion and said element of said second communication portion; and
sending said combined elements to a medium access control module across a first interface toward a process operating on said second network entity.

23. The method of claim 22, wherein said first interface is configured to convey said combined elements at a data rate greater than one gigabit per second.

24. The method of claim 22, further comprising:
receiving a first idle code on each of said first channel and said second channel prior to said receiving a first portion of a communication; and
receiving a second idle code on each of said first channel and said second channel after said receiving a second portion of said communication.

25. A method of receiving a communication from a first network entity at a second network entity across a plurality of channels, comprising:
receiving synchronization information across each of a plurality of channels coupling a first network entity to a second network entity;
receiving at said second network entity a set of bytes across each of said channels;
detecting a first byte and a last byte in each of said sets of bytes;
decoding each of said sets of bytes; and
re-assembling said sets of bytes into a stream of bytes of a communication directed from said first network entity to said second network entity.

26. The method of claim 25, in which:
said receiving synchronization information comprises receiving a first idle code on each of said channels; and
wherein said method further comprises receiving a second idle code on each of said channels after said receiving a set of bytes across each of said channels.

27. A method of operating a computer to communicate with a network entity, comprising:
operating a medium access control module configured to communicate a first frame from a computer system to a network entity and receive a second frame at said computer system from said network entity;
operating a distribution module to apportion contents of said first frame among a plurality of communication channels coupling said computer system to said network entity through one or more communication links; and
operating a collection module to combine contents of said second frame received through said plurality of communication channels;
wherein said distribution module and said collection module interface with each of said communication channels at a rate exceeding one gigabit per second; and
wherein said medium access control module interfaces with said distribution module and said collection module at a rate substantially equal to the sum of said rates at which said communication channels interface with said distribution module and said collection module.

28. The method of claim 27, further comprising:
operating a physical medium module configured to encode said first frame contents for transmission over said communication channels and decode said second frame contents received over said communication channels.

29. The method of claim 27, wherein said first frame is a communication frame configured for transmission over a network compatible with an Ethernet communication protocol.

30. A network interface device for coupling a computer system to a network, comprising:
a medium access control module configured to communicate with an application executing on a computer system;
multiple physical coding modules, wherein each said physical coding module is configured to encode packet bytes for transmission on a network medium and decode encoded bytes received from said network medium, and wherein said network medium is configured to carry said bytes between said computer system and a network entity;
a distributor configured to accept a first packet from said medium access control module and divide said first packet into a first plurality of packet bytes for transmission across said network medium; and
a collector configured to accept a second plurality of packet bytes from said multiple physical coding modules and combine said second plurality of packet bytes into a second packet for transfer to said medium access control module.

31. The network interface device of claim 30, further comprising a first set of interfaces coupling said multiple physical coding modules to said distributor and said collector, wherein each of said first set of interfaces is configured to operate at a rate exceeding one gigabit per second.

32. The network interface device of claim 31, further comprising a second interface coupling said distributor and said collector to said medium access control module, wherein said second interface is configured to operate at a rate approximately equal to the sum of said operation rates of said first set of interfaces.

33. The network interface device of claim 32, wherein said second interface is configured to operate at a data rate of approximately ten gigabits per second.

34. A device for implementing an Ethernet protocol to communicate Ethernet frames between a first network entity and a second network entity, comprising:
- a distributor configured to distribute bytes of a first Ethernet frame over a plurality of channels in a first order;
- a collector configured to receive bytes of a second Ethernet frame over said channels in a second order;
- a first interface coupling said distributor and said collector to a medium access control module at a data rate exceeding one gigabit per second, wherein data are transferred across said first interface in multi-byte units in synchronization with both edges of a clock signal; and
- a second interface coupling said distributor and said collector to a first physical coding module at a data rate exceeding one gigabit per second in synchronization with both edges of a second clock signal.

35. The device of claim 34, wherein said first order and said second order are round robin.

36. The method of claim 1, wherein said first interface is configured to convey said communication at a data rate exceeding one gigabit per second.

37. The method of claim 1, in which said sending a first portion of said communication comprises forwarding an apportionment of said communication elements to a first physical coding module across a second interface; and
- wherein said first physical coding module is configured to perform said encoding of said first portion of said communication.

38. The method of claim 37, wherein said first physical coding module:
- encodes a first element of said apportionment with a first start code if said first element is the first element of said communication and otherwise encodes said first element of said apportionment with a second start code; and
- encodes a last element of said apportionment with a first end code if said last element is the last element of said communication and otherwise encodes said last element of said apportionment with a second end code.

39. The method of claim 27, wherein said second interface is configured to convey said apportionment at a data rate exceeding one gigabit per second.

40. The method of claim 1, further comprising:
- transmitting a first idle signal on said first channel and said second channel prior to said receiving; and
- transmitting a second idle signal on said first channel and said second channel after said sending said second portion of said communication;
- wherein said second idle signal is different from said first idle signal.

41. The method of claim 1, further comprising:
- encoding said first portion of said communication with a first ending delimiter; and
- encoding said second portion of said communication with a second ending delimiter;
- wherein said second ending delimiter is different from said first ending delimiter.

42. A computer readable storage medium storing instructions that, when executed by a computer, cause the computer to perform a method of transmitting a communication from a first network entity to a second network entity, the method comprising:
- receiving a communication at a distribution module of a network interface device from a medium access control module across a first interface, wherein said distribution module is configured to distribute portions of said communication among a plurality of communication channels;
- distributing elements of said communication into multiple portions, each said portion corresponding to one of a plurality of channels established to convey a communication between said first network entity and said second network entity;
- encoding a first portion of said communication with a first starting delimiter;
- encoding a second portion of said communication with a second starting delimiter, wherein said second starting delimiter is different from said first starting delimiter;
- sending said first portion of said communication on a first channel established on a first communication medium coupled to said first network entity and said second network entity; and
- sending said second portion of said communication on a second channel established on a second communication medium coupled to said first network entity and said second network entity;
- wherein said communication is transmitted to said second entity at a data rate in excess of one gigabit per second.

43. The method of claim 3, wherein said communication is transmitted to said second entity at a data rate in excess of one gigabit per second.

44. The method of claim 3, wherein said communication is an Ethernet frame and wherein each of said multiple portions of said communication comprises one or more bytes.

45. A computer readable storage medium storing instructions that, when executed by a computer, cause the computer to perform a method of transmitting a communication from a first network entity to a second network entity, the method comprising:
- receiving a communication at a distribution module of a network interface device from a medium access control module across a first interface, wherein said distribution module is configured to distribute portions of said communication among a plurality of communication channels;
- distributing elements of said communication into multiple portions;
- sending a first portion of said communication on a first channel established on a first communication medium coupled to said first network entity and said second network entity; and
- sending a second portion of said communication on a second channel established on a second communication medium coupled to said first network entity and said second network entity.

46. The method of claim 21, wherein said forwarding comprises sending said combined elements to a medium access control module across a first interface toward a process operating on said second network entity.

47. The method of claim 46, wherein said first interface is configured to convey said combined elements at a data rate greater than one gigabit per second.

48. A computer readable storage medium storing instructions that, when executed by a computer, cause the computer to perform a method of receiving a communication at a second network entity from a first network entity, the method comprising:

receiving at a second network entity a first idle code on each of multiple channels established between a first network and said second network entity;

receiving at said second network entity a first portion of a communication from said first network entity on a first channel of said multiple channels;

receiving at said second network entity a second portion of said communication on a second channel of said multiple channels;

collecting an element of said first portion and an element of said second portion;

receiving at said second network entity a second idle code, different from said first idle code, on each of said multiple channels; and forwarding said communication toward a process operating on said second network entity.

49. The method of claim 22, wherein said communication is an Ethernet frame.

50. The method of claim 22, wherein said first portion of a communication comprises:

a first start signal configured to indicate a beginning of said communication; and a first set of elements of said communication.

51. The method of claim 50, wherein said second portion of a communication comprises:

a second start signal configured to indicate a beginning of a portion of said communication, said second start signal differing from said first start signal; and a second set of elements of said communication.

52. A computer readable storage medium storing instructions that, when executed by a computer, cause the computer to perform a method of receiving a communication at a second network entity from a first network entity, the method comprising:

receiving at a second network entity a first portion of a communication from a first network entity on a first channel established between said first network entity and said second network entity;

receiving at said second network entity a second portion of said communication on a second channel established between said first network entity and said second network entity;

receiving at a collection module an element of said first communication portion and an element of said second communication portion;

combining said element of said first communication portion and said element of said second communication portion; and sending said combined elements to a medium access control module across a first interface toward a process operating on said second network entity.

53. The method of claim 25, wherein:

the communication is a packet; and said receiving a set of bytes comprises receiving across each said channel a mini-frame comprising a portion of the packet.

54. The method of claim 53, wherein said detecting comprises:

on a first of said channels, identifying a start of packet delimiter; and on the other channels of said channels, identifying a start of mini-frame delimiter.

55. The method of claim 53, wherein said detecting comprises:

on a first of said channels, identifying an end of packet delimiter; and on the other channels of said channels, identifying an end of mini-frame delimiter.

56. The method of claim 53, wherein:

said re-assembling comprises merging said mini-frames to re-form the packet; and the method further comprises forwarding the packet toward a medium access control module.

57. The method of claim 25, wherein each said set of bytes is received at a data rate exceeding one gigabit per second.

58. The method of claim 25, wherein said decoding comprises:

at a physical coding module coupled to each of said channels, decoding a set of bytes from codes received over said channel.

59. A computer readable storage medium storing instructions that, when executed by a computer, cause the computer to perform a method of receiving a communication from a first network entity at a second network entity across a plurality of channels, the method comprising:

receiving synchronization information across each of a plurality of channels coupling a first network entity to a second network entity;

receiving at said second network entity a set of bytes across each of said channels;

detecting a first byte and a last byte in each of said sets of bytes;

decoding each of said sets of bytes; and re-assembling said sets of bytes into a stream of bytes of a communication directed from said first network entity to said second network entity.

60. The method of claim 27, wherein said distribution module apportions said contents of said first frame by:

receiving a portion of said first frame from said medium access control module; and distributing said portion of said first frame among said plurality of communication channels in round robin order.

61. The method of claim 27, wherein said collection module combines said contents of said second frame by:

merging, in round robin order, segments of said second frame received from said plurality of communication channels; and forwarding said merged segments to said medium access control module.

62. A computer readable storage medium storing instructions that, when executed by a computer, cause the computer to perform a method of operating a computer to communicate with a network entity, the method comprising:

operating a medium access control module configured to communicate a first frame from a computer system to a network entity and receive a second frame at said computer system from said network entity;

operating a distribution module to apportion contents of said first frame among a plurality of communication channels coupling said computer system to said network entity through one or more communication links; and operating a collection module to combine contents of said second frame received through said plurality of communication channels;

wherein said distribution module and said collection module interface with each of said communication channels at a rate exceeding one gigabit per second; and wherein said medium access control module interfaces with said distribution module and said collection module at a rate substantially equal to the sum of said rates at which said communication channels interface with said distribution module and said collection module.

63. A method of transmitting a communication from a first network entity to a second network entity, wherein the first network entity and the second network entity are coupled to a communication medium, comprising:

transmitting a first idle signal on a first channel and a second channel established on a first communication medium coupled to a first network entity and a second network entity;

receiving a communication from a process operating on said first network entity, wherein the communication is directed to said second network entity;

distributing elements of said communication into multiple portions;

sending a first portion of said communication on said first channel;

sending a second portion of said communication on said second channel; and transmitting a second idle signal on said first channel and said second channel after said sending said second portion of said communication, wherein said second idle signal is different from said first idle signal;

wherein said communication is transmitted to said second entity at a data rate in excess of one gigabit per second;

wherein one of said first portion of said communication and said second portion of said communication includes a first start symbol configured to indicate a start of said communication and the other of said first portion and said second portion includes a second start symbol configured to indicate a start of a portion of said communication; and wherein one of said first portion of said communication and said second portion of said communication includes a first end symbol configured to indicate an end of said communication and the other of said first portion and said second portion includes a second end symbol configured to indicate an end of a portion of said communication.

64. The method of claim 63, wherein:

said receiving comprises receiving a communication at a distribution module of a network interface device from a medium access control module across a first interface; and said distribution module is configured to distribute portions of said communication among a plurality of communication channels, including said first channel and said second channel.

65. The method of claim 64, wherein said first interface is configured to convey said communication at a data rate exceeding one gigabit per second.

66. The method of claim 64, in which said sending a first portion of said communication comprises forwarding an apportionment of said communication elements to a first physical coding module across a second interface; and wherein said first physical coding module is configured to encode said apportionment of communication elements into a series of codes for transmission over said first communication medium.

67. The method of claim 66, wherein said first physical coding module:

encodes a first element of said apportionment with a first start code if said first element is the first element of said communication and otherwise encodes said first element of said apportionment with a second start code; and encodes a last element of said apportionment with a first end code if said last element is the last element of said communication and otherwise encodes said last element of said apportionment with a second end code.

68. The method of claim 66, wherein said second interface is configured to convey said first apportionment at a data rate exceeding one gigabit per second.

69. The method of claim 63, in which said distributing comprises:

allotting elements of said communication among a plurality of channels established to convey a communication between said first network entity and said second network entity, including said first channel and said second channel.

70. The method of claim 63, further comprising:

encoding the first element of said first portion of said communication with a first starting delimiter; and encoding the first element of said second portion of said communication with a second starting delimiter;

wherein said second starting delimiter is different from said first starting delimiter.

71. The method of claim 70, further comprising:

encoding the last element of said first portion of said communication with a first ending delimiter; and encoding the last element of said second portion of said communication with a second ending delimiter;

wherein said second ending delimiter is different from said first ending delimiter.

72. A computer readable storage medium storing instructions that, when executed by a computer, cause the computer to perform a method of transmitting a communication from a first network entity to a second network entity, wherein the first network entity and the second network entity are coupled to a communication medium, the method comprising:

transmitting a first idle signal on a first channel and a second channel established on a first communication medium coupled to a first network entity and a second network entity;

receiving a communication from a process operating on said first network entity, wherein the communication is directed to said second network entity;

distributing elements of said communication into multiple portions;

sending a first portion of said communication on said first channel;

sending a second portion of said communication on said second channel; and transmitting a second idle signal on said first channel and said second channel after said sending said second portion of said communication, wherein said second idle signal is different from said first idle signal;

wherein said communication is transmitted to said second entity at a data rate in excess of one gigabit per second;

wherein one of said first portion of said communication and said second portion of said communication includes a first start symbol configured to indicate a start of said communication and the other of said first portion and said second portion includes a second start symbol configured to indicate a start of a portion of said communication; and wherein one of said first portion of said communication and said second portion of said communication includes a first end symbol configured to indicate an end of said communication and the other of said first portion and said second portion includes a second end symbol configured to indicate an end of a portion of said communication.

73. A method of transmitting a communication from a first network entity to a second network entity, wherein the first network entity and the second network entity are coupled to a communication medium, comprising:

transmitting a first idle signal on:
- a first channel established on a first communication medium coupled to said first network entity and said second network entity; and
- a second channel established on a second communication medium coupled to said first network entity and said second network entity;

receiving a communication from a process operating on said first network entity, wherein the communication is directed to said second network entity;

distributing elements of said communication into multiple portions;

sending a first portion of said communication on said first channel;

sending a second portion of said communication on said second channel; and transmitting a second idle signal on said first channel and said second channel after said sending a second portion of said communication, wherein said second idle signal is different from said first idle signal;

wherein said communication is transmitted to said second entity at a data rate in excess of one gigabit per second.

74. The method of claim 73, wherein:

said receiving comprises receiving a communication at a distribution module of a network interface device from a medium access control module across a first interface; and said distribution module is configured to distribute portions of said communication among a plurality of communication channels, including said first channel and said second channel.

75. The method of claim 74, wherein said first interface is configured to convey said communication at a data rate exceeding one gigabit per second.

76. The method of claim 74, in which said sending a first portion of said communication comprises forwarding an apportionment of said communication elements to a first physical coding module across a second interface; and wherein said first physical coding module is configured to encode said apportionment of communication elements into a series of codes for transmission over said first communication medium.

77. The method of claim 76, wherein said first physical coding module:

encodes a first element of said apportionment with a first start code if said first element is the first element of said communication and otherwise encodes said first element of said apportionment with a second start code; and encodes a last element of said apportionment with a first end code if said last element is the last element of said communication and otherwise encodes said last element of said apportionment with a second end code.

78. The method of claim 76, wherein said second interface is configured to convey said first apportionment at a data rate exceeding one gigabit per second.

79. The method of claim 73, in which said distributing comprises:

allotting elements of said communication among a plurality of channels established to convey a communication between said first network entity and said second network entity, including said first channel and said second channel.

80. The method of claim 73, wherein:

one of said first portion of said communication and said second portion of said communication includes a first start symbol configured to indicate a start of said communication and the other of said first portion and said second portion includes a second start symbol configured to indicate a start of a portion of said communication; and one of said first portion of said communication and said second portion of said communication includes a first end symbol configured to indicate an end of said communication and the other of said first portion and said second portion includes a second end symbol configured to indicate an end of a portion of said communication.

81. The method of claim 73, further comprising:

encoding the first element of said first portion of said communication with a first starting delimiter; and encoding the first element of said second portion of said communication with a second starting delimiter;

wherein said second starting delimiter is different from said first starting delimiter.

82. The method of claim 81, further comprising:

encoding the last element of said first portion of said communication with a first ending delimiter; and encoding the last element of said second portion of said communication with a second ending delimiter;

wherein said second ending delimiter is different from said first ending delimiter.

83. The method of claim 73, wherein said sending a first portion of said communication comprises:

encoding said first portion of said communication with a first start code if said first portion of said communication includes the initial byte of said communication.

84. The method of claim 83, wherein said sending a first portion of said communication further comprises:

encoding said first portion of said communication with a second start code, different from said first start code, if said first portion of said communication does not include the initial byte of said communication.

85. The method of claim 83, wherein said sending a first portion of said communication further comprises:

encoding said first portion of said communication without a start code if said first portion of said communication does not include the initial byte of said communication.

86. The method of claim 73, wherein said sending a second portion of said communication comprises:

encoding said second portion of said communication with a first end code if said second portion of said communication includes the final byte of said communication.

87. The method of claim 86, wherein said sending a second portion of said communication further comprises:

encoding said second portion of said communication with a second end code, different from said first end code, if said second portion of said communication does not include the final byte of said communication.

88. The method of claim 86, wherein said sending a second portion of said communication further comprises:
    encoding said second portion of said communication without an end code if said second portion of said communication does not include the final byte of said communication.

89. A computer readable storage medium storing instructions that, when executed by a computer, cause the computer to perform a method of transmitting a communication from a first network entity to a second network entity, wherein the first network entity and the second network entity are coupled to a communication medium, the method comprising:
    transmitting a first idle signal on:
        a first channel established on a first communication medium coupled to said first network entity and said second network entity; and
        a second channel established on a second communication medium coupled to said first network entity and said second network entity;
    receiving a communication from a process operating on said first network entity, wherein the communication is directed to said second network entity;
    distributing elements of said communication into multiple portions;
    sending a first portion of said communication on said first channel;
    sending a second portion of said communication on said second channel; and
    transmitting a second idle signal on said first channel and said second channel after said sending a second portion of said communication, wherein said second idle signal is different from said first idle signal;
    wherein said communication is transmitted to said second entity at a data rate in excess of one gigabit per second.

90. The device of claim 34, wherein said distributor distributes a substantially equivalent number of bytes of the first Ethernet frame over each channel in said plurality of channels.

91. The device of claim 34, wherein said collector receives a substantially equivalent number of bytes of the second Ethernet frame over each channel in said plurality of channels.

92. The device of claim 34, further comprising a separate physical coding module for each channel in said plurality of channels, including said first physical coding module corresponding to a first channel.

93. The device of claim 92, wherein each said physical coding module is configured to encode the bytes of the first Ethernet frame that are distributed over the corresponding channel in said plurality of channels.

94. The device of claim 34, wherein:
    a first idle is distributed over each channel in said plurality of channels before distributing the bytes of the first Ethernet frame; and
    a second idle, different from said first idle, is distributed over each channel in said plurality of channels after distributing the bytes of the first Ethernet frame.

95. The device of claim 34, wherein a first set of bytes of the first Ethernet frame that are distributed over a first channel in said plurality of channels are preceded by a start code if said first set of bytes includes the initial byte of the first Ethernet frame.

96. The device of claim 34, wherein bytes of the first Ethernet frame that are distributed over each channel in said plurality of channels are preceded by a start code.

97. The device of claim 96, wherein said start code is different for a first channel in said plurality of channels than for one or more other channels in said plurality of channels.

98. The device of claim 34, wherein a last set of bytes of the first Ethernet frame that are distributed over a last channel in said plurality of channels are followed by an end code if said last set of bytes includes the final byte of the first Ethernet frame.

99. The device of claim 34, wherein bytes of the first Ethernet frame that are distributed over each channel in said plurality of channels are followed by an end code.

100. The device of claim 99, wherein said end code is different for a first channel in said plurality of channels than for the other channels in said plurality of channels.

101. The device of claim 34, wherein each channel in said plurality of channel traverses a separate physical communication link between the first network entity and the second network entity.

102. The device of claim 34, wherein each channel in said plurality of channel traverses a common physical communication link between the first network entity and the second network entity.

103. The device of claim 34, wherein said collector is further configured to:
    combine the bytes to produce the second Ethernet frame; and
    forward the second Ethernet frame to the medium access control module.

104. The device of claim 34, wherein said clock signal and said second clock signal are the same clock signal.

105. The network interface device of claim 30, wherein:
    said multiple physical coding modules include a first physical coding module;
    said first plurality of packet bytes includes a first subset of bytes of said first packet; and
    said first physical coding module is configured to:
        encode said first subset of bytes with a first start code if said first subset of bytes includes the initial byte of said first packet; and
        otherwise, encode said first subset of bytes without a start code.

106. The network interface device of claim 30, wherein:
    said multiple physical coding modules include a first physical coding module;
    said first plurality of packet bytes includes a first subset of bytes of said first packet; and
    said first physical coding module is configured to:
        encode said first subset of bytes with a first start code if said first subset of bytes includes the initial byte of said first packet; and
        otherwise, encode said first subset of bytes with a second start code different from said first start code.

107. The network interface device of claim 30, wherein:
    said multiple physical coding modules include a first physical coding module;
    said first plurality of packet bytes includes a last subset of bytes of said first packet; and
    said first physical coding module is configured to:
        encode said last subset of bytes with a first end code if said last subset of bytes includes the final byte of said first packet; and
        otherwise, encode said last subset of bytes without an end code.

108. The network interface device of claim 30, wherein:

said multiple physical coding modules include a first physical coding module;

said first plurality of packet bytes includes a last subset of bytes of said first packet; and said first physical coding module is configured to:
  encode said last subset of bytes with a first end code if said last subset of bytes includes the final byte of said first packet; and
  otherwise, encode said last subset of bytes with a second end code different from said first end code.

109. The method of claim 25, wherein said decoding comprises:

decoding a first start code in a one of said sets of bytes, said one set of bytes containing an initial byte of the communication;

wherein no other set of bytes includes a start code.

110. The method of claim 25, wherein said decoding comprises:

decoding a first start code in one of said sets of bytes, said one set of bytes containing an initial byte of the communication; and decoding a second start code in a different set of bytes, said second start code differing from said first start code.

111. The method of claim 25, wherein said decoding comprises:

decoding a first end code in one of said sets of bytes, said one set of bytes containing a final byte of the communication;

wherein no other set of bytes includes an end code.

112. The method of claim 25, wherein said decoding comprises:

decoding a first end code in one of said sets of bytes, said one set of bytes containing a final byte of the communication; and decoding a second end code in a different set of bytes, said second end code differing from said first end code.

113. The method of claim 3, wherein said sending a first portion of said communication comprises:

encoding said first portion with a first start code if said first portion includes the initial element of said communication.

114. The method of claim 113, wherein said sending a first portion of said communication further comprises:

encoding said first portion without a start code if said first portion does not include said initial element of said communication.

115. The method of claim 113, wherein said sending a first portion of said communication further comprises:

encoding said first portion with a second start code, different from said first start code, if said first portion does not include said initial element of said communication.

116. The method of claim 3, wherein said sending a second portion of said communication comprises:

encoding said second portion with a first end code if said second portion includes the final element of said communication.

117. The method of claim 116, wherein said sending a second portion of said communication further comprises:

encoding said second portion without an end code if said second portion does not include said final element of said communication.

118. The method of claim 116, wherein said sending a second portion of said communication further comprises:

encoding said second portion with a second end code, different from said first end code, if said second portion does not include said final element of said communication.

119. The method of claim 1, wherein said first portion of said communication includes the initial byte of said communication.

120. The method of claim 1, wherein said second portion of said communication does not include the initial byte of said communication.

121. The method of claim 1, wherein said encoding a second portion of said communication comprises:

encoding said second portion of said communication with a first end code if said second portion of said communication includes the final byte of said communication.

122. The method of claim 121, wherein said encoding a second portion of said communication further comprises:

encoding said second portion of said communication with a second end code, different from said first end code, if said second portion of said communication does not include the final byte of said communication.

123. A method of transmitting a communication from a first network entity to a second network entity, wherein the first network entity and the second network entity are coupled to a communication medium, comprising:

receiving a communication from a process operating on a first network entity, wherein the communication is directed to a second network entity;

receiving said communication at a distribution module of a network interface device from a medium access control module across a first interface at a data rate exceeding one gigabit per second;

distributing elements of said communication into multiple portions, each said portion corresponding to one of a plurality of channels established to convey a communication between said first network entity and said second network entity;

transferring a first portion of said communication to a first physical coding module across a second interface at a data rate exceeding one gigabit per second;

transferring a second portion of said communication to a second physical coding module across the second interface;

sending said first portion of said communication on a first channel established on a first communication medium coupled to said first network entity and said second network entity; and sending said second portion of said communication on a second channel established on a second communication medium coupled to said first network entity and said second network entity;

wherein said communication is transmitted to said second entity at a data rate in excess of one gigabit per second; and wherein:

one of said first portion of said communication and said second portion of said communication includes a first start symbol configured to indicate a start of said communication and the other of said first portion and said second portion includes a second start symbol configured to indicate a start of a portion of said communication; and one of said first portion of said communication and said second portion of said communication includes a first end symbol configured to indicate an end of said communication and the other of said first portion and said second portion includes a second end symbol configured to indicate an end of a portion of said communication.

124. The method of claim 123,
wherein said first physical coding module is configured to encode said first portion of said communication with one or more of said first start symbol, said second start symbol, said first end symbol and said second end symbol.

125. The method of claim 123, further comprising:
transmitting a first idle signal on said first channel and said second channel prior to receiving said communication at said distribution module; and
transmitting a second idle signal on said first channel and said second channel after said sending said second portion of said communication;
wherein said second idle signal is different from said first idle signal.

* * * * *